United States Patent
Kogure et al.

(10) Patent No.: US 7,471,429 B2
(45) Date of Patent: Dec. 30, 2008

(54) VIBRATION DETECTION APPARATUS, HOLOGRAM APPARATUS, VIBRATION DETECTION METHOD FOR THE VIBRATION DETECTION APPARATUS, AND RECORDING METHOD FOR THE HOLOGRAM APPARATUS

(75) Inventors: Kazuya Kogure, Gunma (JP); Kevin Curtis, Longmont, CO (US); Ken E. Anderson, Boulder, CO (US)

(73) Assignees: Sanyo Electric Co., Ltd., Osaka (JP); Imphase Technologies, Longmont, CO (US)

( * ) Notice: Subject to any disclaimer, the term of this patent is extended or adjusted under 35 U.S.C. 154(b) by 315 days.

(21) Appl. No.: 11/276,504

(22) Filed: Mar. 2, 2006

(65) Prior Publication Data
US 2007/0183008 A1    Aug. 9, 2007

(30) Foreign Application Priority Data
Feb. 8, 2006   (JP)   .............................. 2006-030917

(51) Int. Cl.
G03H 1/00   (2006.01)
G11B 7/00   (2006.01)
G11B 11/00   (2006.01)
G11B 27/36   (2006.01)

(52) U.S. Cl. ...................... 359/1; 369/44.32; 369/53.18
(58) Field of Classification Search .................... 359/1, 359/22, 35; 369/44.32, 47.44, 53.18
See application file for complete search history.

(56) References Cited

U.S. PATENT DOCUMENTS

| 6,956,681 | B2 * | 10/2005 | Anderson | 359/21 |
| 7,324,414 | B2 * | 1/2008 | Tsuchiya et al. | 369/44.32 |
| 2005/0180276 | A1 * | 8/2005 | Watanabe et al. | 369/44.29 |

* cited by examiner

*Primary Examiner*—Alessandro Amari
(74) *Attorney, Agent, or Firm*—Fish & Richardson P.C.

(57) ABSTRACT

A hologram apparatus comprises a vibration detection beam generation unit to apply a vibration detection beam, incoherent to the data and reference beams and to detect the presence/absence of vibrations, to the hologram recording medium; a light reception/determination unit to receive the vibration detection beam emitted from the medium after the beam is applied to and propagates through the medium and to determine whether the beam receiving position is within a preset range; and an interruption unit to interrupt at least one of the data and reference beams from being applied to the medium, when this unit has determined that the position of beam reception is not within the preset range.

12 Claims, 7 Drawing Sheets

VIBRATION DETECTION APPARATUS, HOLOGRAM APPARATUS, VIBRATION DETECTION METHOD FOR THE VIBRATION DETECTION APPARATUS, AND RECORDING METHOD FOR THE HOLOGRAM APPARATUS

CROSS-REFERENCE TO RELATED APPLICATIONS

The present application claims priority from Japanese Patent Application No. 2006-030917 filed on Feb. 8, 2006, which is herein incorporated by reference.

BACKGROUND OF THE INVENTION

1. Field of the Invention

The present invention relates to a vibration detection apparatus, a hologram apparatus, a vibration detection method for the vibration detection apparatus and a recording method for the hologram apparatus.

2. Description of the Related Art

Among hologram recording media adapted to record digital data as holograms is a photosensitive resin (e.g. photopolymer) sealed between substrates. To record digital data on a hologram recording medium as a hologram, a coherent laser beam from a laser device is first split into two beams by a PBS (Polarization Beam Splitter). Then, one of the two beams (hereinafter referred to as "reference beam") and a laser beam (hereinafter referred to as "data beam") produced by the other beam irradiating an SLM (Spatial Light Modulator) having digital data in the form of a two-dimensional contrast image pattern, which beam reflects information of the two-dimensional contrast image pattern, are irradiated into a hologram recording medium at a given angle. This allows the recording of the digital data into the hologram recording medium.

More specifically, the photosensitive resin making up the hologram recording medium has a finite number of monomers. When the laser beam (hereinafter referred to as "laser beam") made up of the reference and data beams is irradiated thereinto, the monomers change into polymers correspondingly with the energy determined by the light intensity of the laser beam and the irradiation time. As a result of the transformation of the monomers into polymers, an interference fringe, made up of polymers, is formed correspondingly with the laser beam energy. Therefore, as a result of the formation of such interference fringes in the hologram recording medium, digital data is recorded as a hologram. Later, remaining monomers migrate (diffuse) to those locations that have consumed monomers. Further, by applying the laser beams again, changes of such monomers into polymers are iterated. It is to be noted that FIG. 2 schematically illustrates how monomers transform into polymers correspondingly with the laser beam energy in the hologram recording medium.

It is also to be noted that if a large amount of digital data must be recorded in the hologram recording medium, the incidence angle of the reference beam into the hologram recording medium may be varied to achieve a so-called "angle-multiplexed recording" to form a number of holograms. For example, a hologram formed in the hologram recording medium is called a page, whereas a multiplexed hologram made up of a number of pages is called a book. FIG. 3 illustrates relationship between a book and pages in the angle-multiplexed recording. This is a logical construct and not physically how the holograms are stored. As shown in FIG. 3, the incidence angle of the reference beam is varied to form, e.g., ten pages of hologram for a single book in the angle-multiplexed recording. Thus, the angle-multiplexed recording allows for the recording of a large amount of digital data.

To reproduce digital data from the hologram recording medium, on the other hand, the reference beam is irradiated into the interference fringes representing the digital data at the same incidence angle as when the interference fringes were formed. The reference beam diffracted by the interference fringes (hereinafter referred to as "reproduction beam") is received by an image sensor or other means. The reproduction beam received by the image sensor or other means forms a two-dimensional contrast image pattern representing the above-mentioned digital data. Then, the digital data can be reproduced by demodulating this two-dimensional contrast image pattern by a decoder or other means.

Thus, when digital data is reproduced from a hologram recording medium, a two-dimensional contrast image pattern is reproduced from the reproduction beam. Therefore, the reproduction beam at an image sensor or other means must have a light intensity equal to or above a given level to allow the reproduction of the two-dimensional contrast image pattern. To provide the reproduction beam with at least the given level of light intensity, therefore, the interference fringes diffracting the reference beam must have a specified or higher value of diffraction efficiency, which represents the ratio of the reproduction beam light intensity to that of the incident reference beam. It is to be noted that the specified value of diffraction efficiency refers to the reproduction beam having the given level of light intensity.

In the multiplexed recording to a hologram recording medium, a number of holograms, that is, a number of interference fringes are formed as described above. For this reason, the plurality of interference fringes representing a plurality of holograms are formed with extremely small spacing therebetween. For example, assuming that the laser beam wavelength is $\lambda$, the incidence angle of the laser beam into the hologram recording medium $\theta r$ and the refraction angle of the laser beam from the hologram recording medium $\theta s$, then the spacing between the interference fringes can be expressed by $|\lambda/2 \sin((\theta r-\theta s)/2)|$. It is clear therefrom that the spacing between the interference fringes is a minimum of $\lambda/2$ when the angle is maximal (i.e., at $2 \sin((\theta r-\theta s)/2)$. It is also clear that when a helium-neon laser with a wavelength $\lambda$ of 633 nm is used, for example, as the laser beam, the minimum spacing between the interference fringes is 316.5 nm, an extremely small spacing. In the angle-multiplexed recording, therefore, a number of interference fringes must be formed with extremely precise spacing between them. This requires an accurate irradiation of the laser beam into the hologram recording medium.

Meanwhile, the interference fringes are formed in the hologram recording medium as a result of the transformation of a finite number of monomers into polymers. For this reason, each time a page, namely, a group of interference fringes are formed in the hologram recording medium during the angle-multiplexed recording, the monomers in the hologram recording medium gradually diminish in number. In the angle-multiplexed recording to the hologram recording medium, for this reason, the method has been employed where the irradiation time of the laser beam into the hologram recording medium is lengthened gradually to form a number of interference fringes having a diffraction efficiency equal to or greater than the above specified value. This well known 30 year old technique is called scheduling and for an example of scheduling in photopolymers. See Allen Pu, Kevin Curtis, and Demetri Psaltis, "Exposure Schedule for Multiplexing Holograms in Photopolymer Films," Optical Eng., 35 (10): 2824-2829 (1996).

However, such lengthening of the laser beam irradiation time means a higher likelihood of the hologram recording medium, the laser device and others being affected by external vibrations if the system operable to record and reproduce a hologram and the hologram recording medium undergo such vibrations. For this reason, if affected by vibrations of the given level or higher during the laser beam irradiation, the laser beam may fail to be accurately irradiated, so that no interference fringe is formed, or if affected by vibrations over a long period of time during the laser beam irradiation, interference fringes may not be formed with the very precise spacing therebetween as described above. As a result, digital data may fail to be accurately recorded in the hologram recording medium, so that the medium fails to present the full extent of its inherent capability to record a large amount of digital data.

SUMMARY OF THE INVENTION

In light of the foregoing, it is an object of the present invention to provide a vibration detection apparatus, a hologram apparatus, a vibration detection method for the vibration detection apparatus and a recording method for the hologram apparatus capable of controlling the laser beam irradiation from the laser device into the hologram recording medium in response to the level of vibrations.

In order to achieve the above and other objects, according to one aspect of the present invention there is provided a vibration detection apparatus comprising a vibration detection beam generation unit operable to apply a vibration detection beam for detecting the presence/absence of vibrations to a medium; a light reception/determination unit operable to receive the vibration detection beam emitted from the medium after the vibration detection beam from the vibration detection beam generation unit is applied to and propagates through the medium, the light reception/determination unit being operable to determine whether the beam receiving position thereon is within a preset range; and an output unit operable to output a signal indicating that at least one of the medium and the vibration detection beam generation unit is vibrating on the basis of the determination result of the light reception/determination unit when the light reception/determination unit has determined that the position of beam reception is not within the preset range.

Another aspect of the present invention provides a hologram apparatus operable to apply a coherent data beam corresponding to data to be recorded and a coherent reference beam to a hologram recording medium so as to record the data in the form of a hologram in the hologram recording medium, the hologram apparatus comprising a vibration detection beam generation unit operable to apply a vibration detection beam, incoherent to the data and reference beams and to detect the presence/absence of vibrations, to the hologram recording medium; a light reception/determination unit operable to receive the vibration detection beam emitted from the hologram recording medium after the vibration detection beam from the vibration detection beam generation unit is applied to and propagates through the hologram recording medium, the light reception/determination unit being operable to determine whether the beam receiving position is within a preset range; and an interruption unit operable to interrupt at least one of the data and reference beams from applying to the hologram recording medium on the basis of the determination result of the light reception/determination unit when the light reception/determination unit has determined that the position of beam reception is not within the preset range.

Still another aspect of the present invention provides a vibration detection method for the vibration detection apparatus comprising causing a vibration detection beam from a vibration detection beam generation unit for detecting the presence/absence of vibrations to apply to a medium; receiving the vibration detection beam emitted from the medium after the vibration detection beam from the vibration detection beam generation unit is applied to and propagates through the medium; determining whether the beam receiving position is within a preset range; and outputting a signal indicating that at least one of the medium and the vibration detection beam generation unit is vibrating, when the light reception/determination unit has determined that the position of beam reception is not within the preset range.

A further aspect of the present invention provides a recording method for a hologram apparatus operable to apply a coherent data beam corresponding to data to be recorded and a coherent reference beam to a hologram recording medium so as to record the data in the form of a hologram in the hologram recording medium, the recording method comprising applying a vibration detection beam, incoherent to the data and reference beams and to detect the presence/absence of vibrations, to the hologram recording medium; receiving the vibration detection beam emitted from the hologram recording medium after the vibration detection beam is applied to and propagates through the hologram recording medium; determining whether the beam receiving position is within a preset range; and interrupting at least one of the data and reference beams from applying to the hologram recording medium on the basis of the determination result when it has been determined that the position of beam reception is not within the preset range.

According to the present invention there can be provided a vibration detection apparatus, a hologram apparatus, a vibration detection method for the vibration detection apparatus and a recording method for the hologram apparatus capable of controlling the laser beam irradiation from the laser device into a hologram recording medium in response to the level of vibrations.

Features and objects of the present invention other than the above will become apparent from the description of this specification and the accompanying drawings.

DETAILED DESCRIPTION OF THE INVENTION

At least the following matters will be made clear by the explanation in the present specification and the description of the accompanying drawings.

EMBODIMENTS

<Overall Configuration of Vibration Detection apparatus/Hologram Apparatus>

Figure 1:
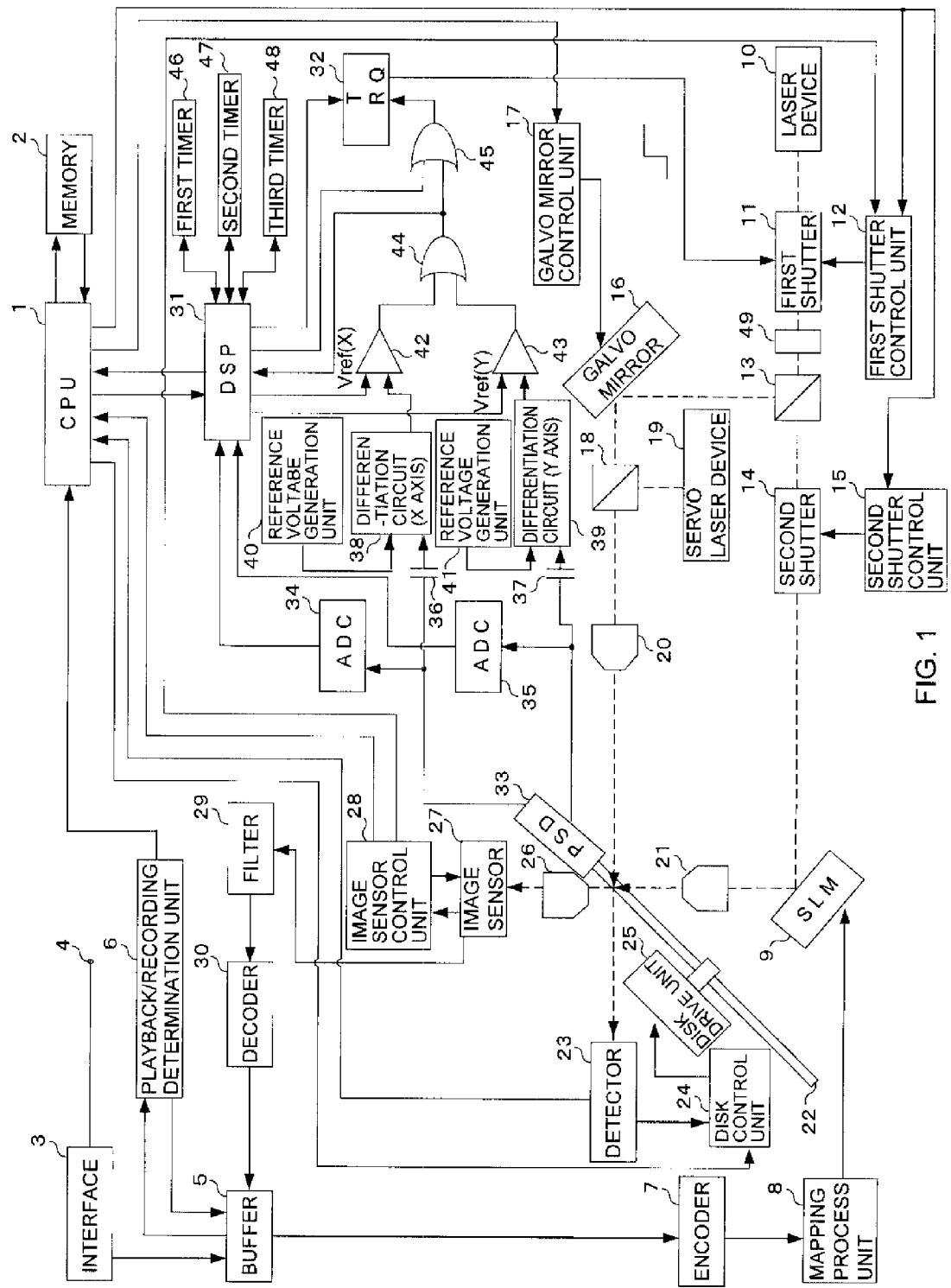
FIG. 1 illustrates an example of the overall configuration of a vibration detection apparatus/hologram apparatus according to the present invention.
Figure 2:
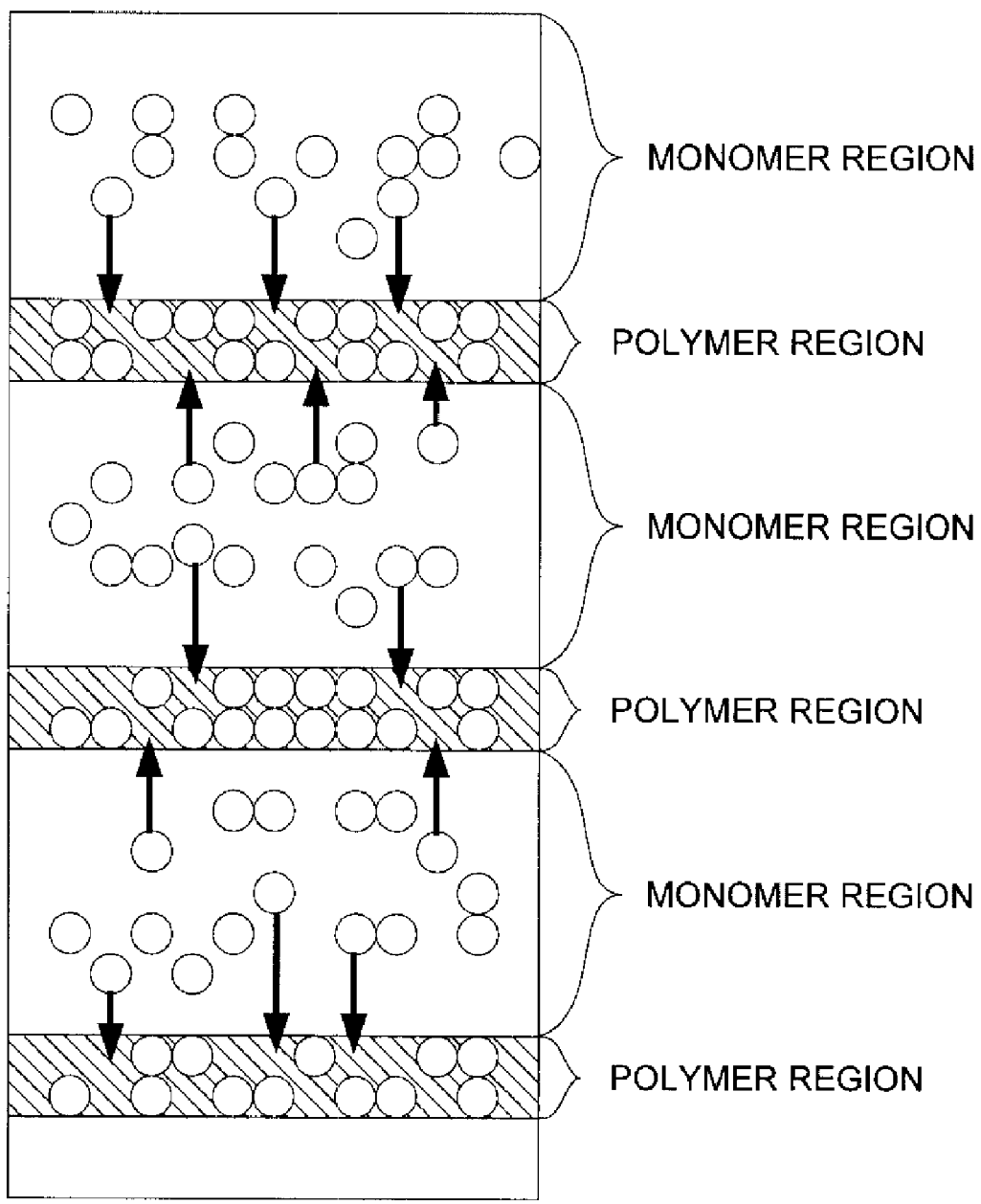
FIG. 2 schematically illustrates how monomers transform into polymers in a hologram recording medium in response to laser beam energy.
Figure 3:
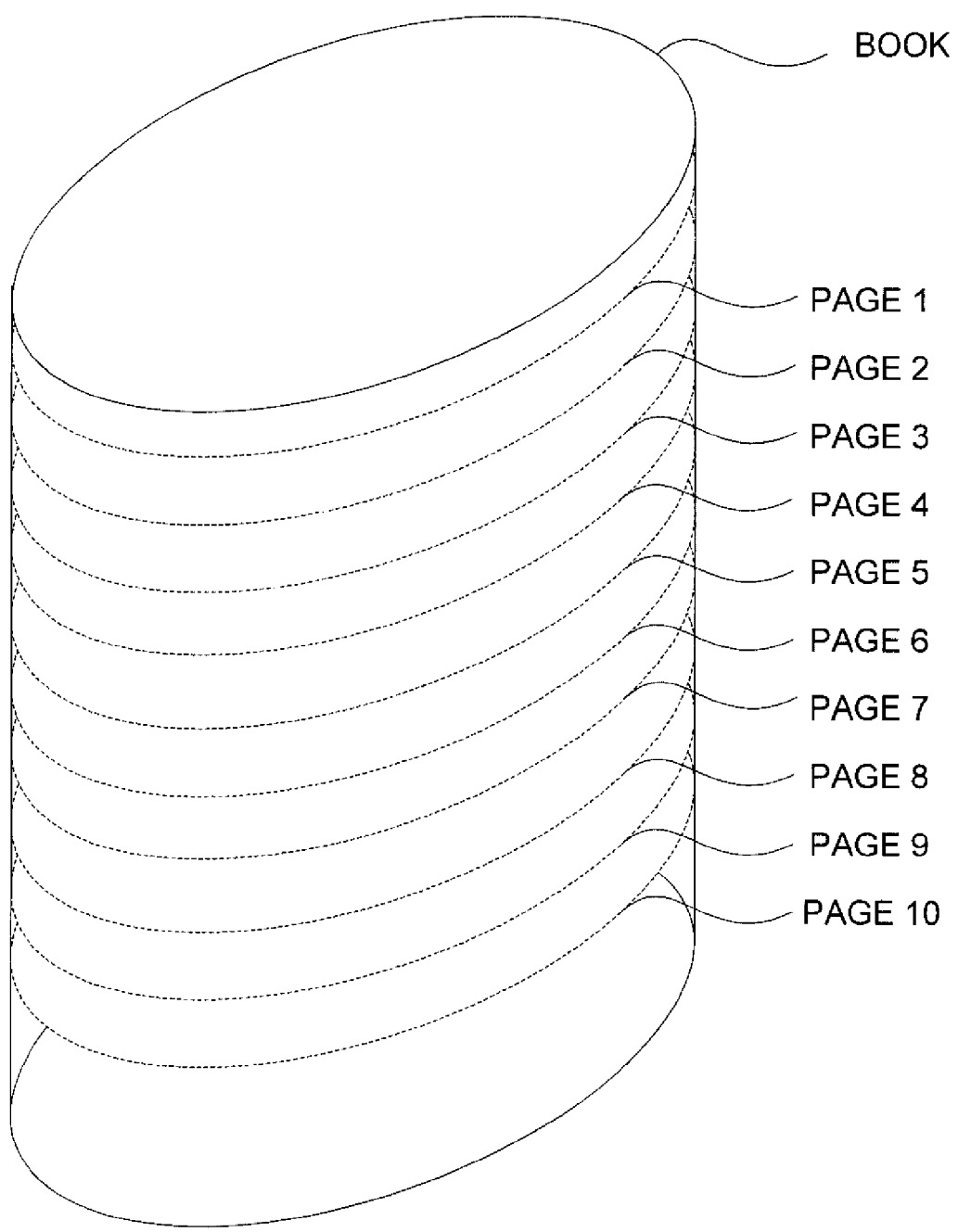
FIG. 3 schematically illustrates a book and pages in the angle-multiplexed recording.
Figure 4:
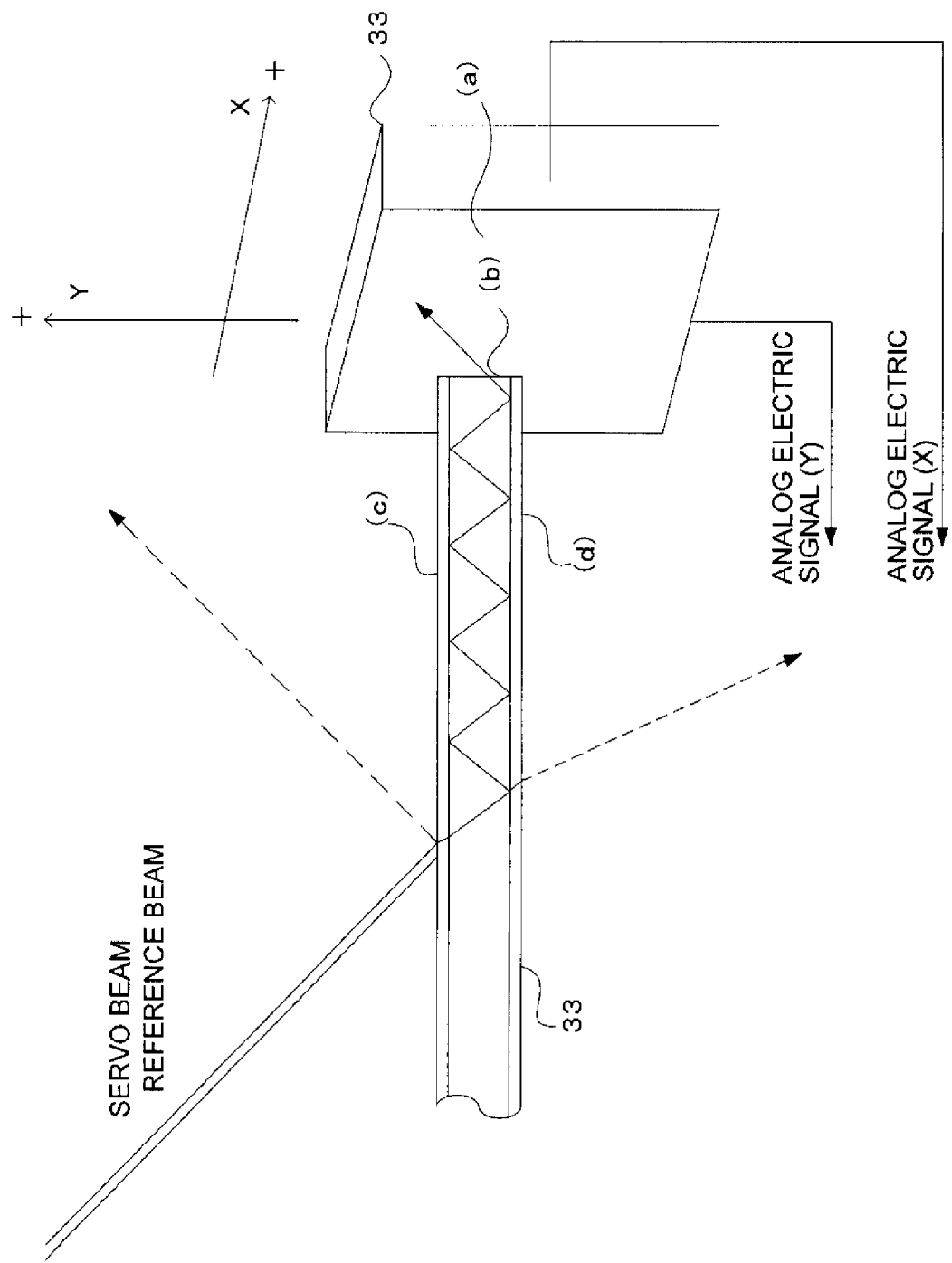
FIG. 4 is a schematic diagram illustrating an example of the reflection, refraction and transmission of a servo laser beam.

A vibration detection apparatus/hologram apparatus according to the present invention will be described with reference to FIGS. 1 and 4. FIG. 1 is a functional block diagram illustrating an example of the overall configuration of the vibration detection apparatus/hologram apparatus according to the present invention. FIG. 4 is a schematic diagram illustrating an example of the reflection, refraction and transmission of a servo laser beam (vibration detection beam) incident upon a disk medium 22 in FIG. 1.

The hologram apparatus has a CPU (Central Processing Unit) 1 (a page count calculation unit), a memory 2, an interface 3, a connection terminal 4, a buffer 5, a reproduction/recording determination unit 6, an encoder 7, a mapping process unit 8, an SLM (Spatial Light Modulator) 9, a laser device 10, a first shutter 11 (an interruption unit), a first shutter control unit 12, a PBS (Polarization Beam Splitter) 13, a second shutter 14, a second shutter control unit 15, a galvo mirror 16 (a deflection unit), a galvo mirror control unit 17 (a deflection control unit), dichroic mirror 18, a servo laser device 19 (a vibration detection beam generation unit), a scanner lens 20, Fourier transform lenses 21 and 26, a detector 23 (a servo control unit), a disk control unit 24 (a servo control unit), a disk drive unit 25 (a servo drive unit), an image sensor 27, an image sensor control unit 28, a filter 29, a decoder 30, a 1/2 wavelength plate 49, a DSP (Digital Signal Processor) 31 (a light reception determination unit, (horizontal/vertical)-vibration amount calculation unit, (horizontal/vertical) vibration amount determination unit, period calculation unit, and period determination unit), a TFF (Toggle flip-flop) 32, a PSD (Position Sensitive Detector) 33 (a light reception/determination unit), ADCs (Analog Digital Converters) 34 and 35 (light reception determination units), coupling capacitors 36 and 37, differentiation circuits (DFCs) 38 (a (horizontal) variation calculation unit) and 39 (a (vertical) variation calculation unit), reference voltage generation units 40 and 41, comparators 42 (a (horizontal) variation determination unit) and 43 (a (vertical) variation determination unit), logical OR circuits 44 and 45, and first, second and third timers 46, 47 and 48. It is to be noted that in the present embodiment, a logical value of '1' represents, for example, a supply voltage for operating the hologram apparatus, whereas the other logical value of '0' represents, for example, 0 (V).

The interface 3 mediates the data send/receive between the host equipment (not shown) such as the PC (Personal Computer) connected via the connection terminal 4 and the hologram apparatus.

The buffer 5 stores reproduction instruction data from the host equipment to reproduce the data recorded in the disk medium 22 (a medium or hologram recording medium). Also, the buffer 5 stores recording instruction data used to record data from the host equipment in the disk medium 22. Further, the buffer 5 stores the data to be recorded in the disk medium 22.

The reproduction/recording determination unit 6 determines at a specified timing whether reproduction or recording instruction data is stored in the buffer 5. When determining that reproduction instruction data is stored in the buffer 5, the reproduction/recording determination unit 6 sends an instruction signal to carry out the reproduction process in the hologram apparatus to the CPU 1. When determining that recording instruction data is stored in the buffer 5, on the other hand, the reproduction/recording determination unit 6 sends an instruction signal to carry out the recording process in the hologram apparatus to the CPU 1 and causes the buffer 5 to send to the encoder 7 the data from the host equipment to be recorded in the disk medium 22. Further, the reproduction/recording determination unit 6 sends information on the amount of the data to be recorded in the disk medium 22 to the CPU 1.

The encoder 7 carries out the encoding process on the data from the buffer 5.

The mapping process unit 8 rearranges the data from the encoder 7 into two-dimensional data layout (e.g., 1280 bits down×1280 bits across≈1.6 Mbits) to form page unit layout data.

The SLM 9 forms a two-dimensional contrast image pattern based on the page unit layout data formed by the mapping process unit 8. This two-dimensional contrast image pattern refers, for example, to a pattern formed by taking one of the logical values of the data bits of the page unit layout data as 'light' and the other logical value as 'dark.' Supposing that the SLM 9 can create a two-dimensional contrast image pattern with 1280 pixels down by 1280 pixels across, the SLM 9 transforms the approximately 1.6 Mbits of data from the mapping process unit 8 into a two-dimensional contrast image pattern with every one bit being represented as a light or dark pixel. When the laser beam from the laser device 10 is applied to the SLM 9 as described later, the SLM 9 reflects the beam toward the Fourier transform lens 21. This reflected beam is a laser beam (hereinafter referred to as "data beam") reflecting information of the two-dimensional contrast image pattern formed by the SLM 9. It is to be noted that the present invention is not limited to the case where the laser beam from the PBS 13 is directly applied to the SLM 9 as shown in FIG. 1. For example, a PBS (not shown) may be provided in the optical path between the second shutter 14 and the SLM 9 such that the laser beam split by the PBS is applied to the SLM 9.

The laser device 10 emits a coherent laser beam, excellent in time and space coherence, to the first shutter 11. Used as the laser device 10 to form a hologram on the disk medium 22 are helium-neon, argon-neon, helium-cadmium, semiconductor, dye, and ruby lasers.

The CPU 1 controls the hologram apparatus overall. Upon receiving an instruction signal on the basis of the recording instruction data from the reproduction/recording determination unit 6, the CPU 1 reads, from the memory 2, the address information indicated by pits already formed in the hologram recording/reproduction medium 22. Then, the CPU 1 sends an instruction signal to rotate the disk medium 22 to the disk control unit 24 in order to irradiate the laser beam from the servo laser device 19 (hereinafter referred to as "servo laser beam") onto the pits in the disk medium 22 representing the next address information. Also, the CPU 1 sends an instruction signal to the galvo mirror control unit 17 to cause this unit to adjust the angle of the galvo mirror 16.

Further, the CPU 1 calculates the number of holograms (i.e., number of pages) to be formed in the hologram recording/reproduction medium 22 based on the data amount information from the reproduction/recording determination unit 6.

Also, the CPU 1 sends a recording instruction signal to the DSP 31 and an instruction signal to the second shutter control unit 15 to open the second shutter 14. This initiates the hologram recording to the disk medium 22. Assuming that the data amount information from the reproduction/recording determination unit 6 indicates three Mbits, the CPU 1 calculates the number of hologram pages to be at least two based on the data volume of 3 Mbits because the SLM 9 can process approximately 1.6 Mbits of data into a two-dimensional contrast image pattern as described earlier. Then, if holograms have yet to be formed on the disk medium 22, the CPU 1 sends the page data corresponding to the first page (first hologram formed in the disk medium 22) to the DSP 31. Then, upon receiving the determination result from the DSP 31 described later, the CPU 1 sends an instruction signal to the second shutter control unit 15 to close the second shutter 14. This terminates the hologram recording to the disk medium 22.

On the other hand, upon receiving an instruction signal based on the reproduction instruction data from the reproduction/recording determination unit 6, the CPU 1 sends an instruction signal to rotate the disk medium 22 to the disk control unit 24 so as to irradiate the servo laser beam from the servo laser device 19 onto the pits in the disk medium 22 representing information of the address specified in the instruction signal. Further, upon receiving an instruction signal on the basis of the reproduction instruction data, the CPU 1 sends an instruction signal to the first shutter control unit 12 to open the first shutter 11 and another signal to the second shutter control unit 15 to close the second shutter 14. Also, the CPU 1 sends an instruction signal to the galvo mirror control unit 17 to cause this unit to adjust the angle of the galvo mirror 16. This initiates the hologram reproduction from the disk medium 22. Then, when determining that the given period of time has elapsed in the reproduction process based on the reproduction instruction data, the CPU 1 sends an instruction signal to the first shutter control unit 12 to close the first shutter 11. This terminates the hologram reproduction from the disk medium 22. It is to be noted that the CPU 1 may terminate the reproduction process in response to a signal based on the determination result from the image sensor control unit 28.

The first shutter control unit 12 exercises control to open or close the first shutter 11 on the basis of the instruction signal from the CPU 1. Also, the first shutter control unit 12 exercises control to close the first shutter 11 on the basis of the instruction signal from the image sensor control unit 28. When opening the first shutter 11, the first shutter control unit 12 sends an open instruction signal to the first shutter 11. On the other hand, when closing the first shutter 11, the first shutter control unit 12 sends a close instruction signal to the first shutter 11.

The first shutter 11 opens when a high level is input from the TFF 32. The first shutter 11 remains open while the high level is input from the TFF 32. On the other hand, the first shutter 11 closes when a low level is input from the TFF 32. The first shutter 11 remains closed while the low level is input from the TFF 32. Further, the first shutter 11 opens on the basis of the open instruction signal from the first shutter control unit 12. And the first shutter 11 closes on the basis of the close instruction signal from the first shutter control unit 12. When the first shutter 11 closes, the laser beam from the laser device 10 is interrupted from applying to the 1/2 wavelength plate 49.

The 1/2 wavelength plate 49 is provided at a given inclination so as to set the angle for the laser beam from the laser device 10 to be applied to the PBS 13 when the first shutter 11 is open. It is to be noted that this given inclination of the 1/2 wavelength plate 49 is determined so as to achieve a desired split ratio of the two laser beams split by the PBS 13.

The PBS 13 splits the laser beam from the 1/2 wavelength plate 49 into two laser beams. One of the laser beams split by the PBS 13 is applied to the second shutter 14. On the other hand, the other laser beam (hereinafter referred to as "reference beam") is applied to the galvo mirror 16.

The galvo mirror 16 reflects the reference beam from the PBS 13 to the dichroic mirror 18.

The galvo mirror control unit 17 controls the angle of the galvo mirror 16 so as to adjust the angle for the reference beam, reflected by the galvo mirror 16, to be applied to the disk medium 22 via the dichroic mirror 18 and the scanner lens 20, based on the instruction signal from the CPU 1. This angle adjustment of the galvo mirror 16 by the galvo mirror control unit 17 is carried out during the recording to the disk medium 22 to ensure that the two-dimensional contrast image pattern information is recorded in the disk medium 22 as a hologram.

More specifically, three-dimensional interference fringes (hologram) are formed by the interference between the data and reference beams within the hologram recording/reproduction medium 22. That is, as a result of the formation of a hologram in the disk medium 22, the two-dimensional contrast image pattern information is recorded. The galvo mirror control unit 17 adjusts the angle of the galvo mirror 16, that is, changes the incidence angle of the reference beam into the disk medium 22, to enable the angle-multiplexed recording. A hologram formed on the disk medium 22 is hereinafter referred to as a page, and a multiplexed recorded hologram with a number of pages above one another created by the angle-multiplexed recording is as a book.

Also, during the reproduction from the disk medium 22, the galvo mirror control unit 17 controls the angle of the galvo mirror 16 when causing the reference beam to apply to the hologram formed in the disk medium 22. This angle adjustment of the galvo mirror 16 by the galvo mirror control unit 17 is carried out during the reproduction from the disk medium 22 to ensure that the reference beam is applied to the hologram, formed by data to be reproduced, at the same incidence angle as the reference beam used to record the data as the hologram.

The servo laser device 19 emits a servo laser beam to the dichroic mirror 18 so as to irradiate the beam onto a pit in the hologram recording/reproduction medium 22 and detect the position of the hologram formed on the medium 22 based on the address information represented by the pit. The servo laser beam emitted from the servo laser device 19 is a beam with a given wavelength that does not affect the hologram formed on the disk medium 22. It is to be noted that in the present embodiment the beam emitted from the laser device 10 is a blue laser beam and that a red laser beam, longer in wavelength than the blue laser beam, is used as the servo laser beam.

The emission of the servo laser beam from the servo laser device 19 begins, for example, when the vibration detection apparatus/hologram apparatus starts its operation, and the servo laser device 19 continues to emit the beam while the vibration detection apparatus/hologram apparatus remains in operation. Although the servo laser device 19 continues the emission, the present invention is not limited thereto. For example, during data recording to the disk medium 22 by the hologram apparatus, the disk medium 22 is paused. For this reason, the irradiation of the servo laser beam by the servo laser device 19 may be halted during the period of time when the irradiation of the beam onto pits is not necessarily required. This can reduce the load associated with the emission of the servo laser beam from the servo laser device 19.

The dichroic mirror 18 transmits the reference beam reflected by the galvo mirror 16 to apply the reference beam to the scanner lens 20. Also, the dichroic mirror 18 reflects the servo laser beam emitted from the servo laser device 19 so that the laser beam is applied to the scanner lens 20.

The scanner lens 20 refracts the reference beam from the dichroic mirror 18 so as to ensure the irradiation of the beam into the disk medium 22. The scanner lens 20 also applies the servo laser beam from the servo laser device 19, reflected by the dichroic mirror 18, to the disk medium 22.

The second shutter control unit 15 exercises control to open or close the second shutter 14 on the basis of the instruction signal from the CPU 1. When opening the second shutter 14, the second shutter control unit 15 sends an open instruction signal to the second shutter 14. When closing the second shutter 14, on the other hand, the second shutter control unit 15 sends a close instruction signal to the second shutter 14. It is to be noted that while, in the present embodiment, the second shutter control unit 15 is provided to exercise control to open or close the second shutter 14 on the basis of the instruction signal from the CPU 1, the present invention is not limited thereto. The second shutter control unit 15 may be, for example, provided to exercise control to open or close the second shutter 14 on the basis of an instruction signal from the DSP 31 that has received a recording instruction signal from the CPU 1 as described above.

The second shutter 14 opens on the basis of the open instruction signal from the second shutter control unit 15. And the second shutter 14 closes on the basis of the closing instruction signal from the second shutter control unit 15. When the second shutter 14 closes, one of the laser beams split by the PBS 13 is interrupted from applying to the SLM 9. It is to be noted that the second shutter 14 may be provided in the optical path of the data beam from the SLM 9 incident upon the disk medium 22 via the Fourier transform lens 21.

The Fourier transform lens 21 first subjects the data beam to the Fourier transform process and then applies the beam to the hologram recording/reproduction medium 22 while collecting the data beam reflecting the two-dimensional contrast image pattern information from the SLM 9.

A photosensitive resin (e.g., photopolymer, silver salt emulsion, gelatine bichromate, photoresist), capable of storing data as a hologram, is used for the disk medium 22. This resin is sealed between glass substrates ((c) and (d) in FIG. 4) to form the disk medium 22. A hologram is formed in the disk medium 22 by the interference between the Fourier-transformed data beam from the Fourier transform lens 21, representing the two-dimensional contrast image pattern, and the reference beam from the scanner lens 20. Then, following the angle adjustment of the galvo mirror 16 by the galvo mirror control unit 17 as described above, another hologram is formed by the interference between the reference beam from the galvo mirror 16 and the data beam. This allows the angle-multiplexed recording to be carried out, thus forming a book.

Meanwhile, wobbles are, for example, formed in advance on the glass substrates forming part of the disk medium 22 and address information is recorded in advance in the wobbles as pits to identify the positions of the holograms to be formed in the hologram recording/reproduction medium 22. Then, the servo laser beam, incident through the scanner lens 20 from the servo laser device 19, is irradiated onto pits representing address information. The servo laser beam having irradiated the pits representing the address information is incident on the detector 23.

Part of this servo laser beam is reflected by the glass substrate forming part of the disk medium 22 when applying to the disk medium 22, whereas other part of the beam transmits through the disk medium 22. A yet other part of the beam transmits through the glass substrate and is repeatedly reflected within the disk medium 22 and emitted from the end face of the disk medium 22 ((b) in FIG. 4). It is to be noted that while glass substrates are used for the disk medium 22 in the present embodiment, the present invention is not limited thereto. The disk medium 22 may be configured to have a reflection layer (e.g., an aluminum thin film) capable of reflecting the servo laser beam within the disk medium 22, which is used, for example, for a CD (Compact Disk). Moreover, while the disk medium 22 is used to record a hologram in the present embodiment, the present invention is not limited thereto. For example, a polygonal medium may be used. The disk medium 22 is used in the present embodiment because the end face of the disk medium 22 is shaped so as to facilitate the reception by the PSD 33 of the servo laser beam emitted after repeated reflection within the disk medium 22.

The PSD 33 has a light reception surface ((a) in FIG. 4) that receives the part of the servo laser beam emitted from the end face of the disk medium 22 after the reflection within this medium. The PSD 33 outputs an analog electric signal (X) corresponding to the position in the X direction (see FIG. 4) of the diameter of the incident servo laser beam to the coupling capacitor 36 and the ADC 34. The PSD 33 also outputs an analog electric signal (Y) corresponding to the position in the Y direction (see FIG. 4) of the diameter of the incident servo laser beam to the coupling capacitor 37 and the ADC 35. It is to be noted that the present embodiment will be described on the assumption that the plus Y direction is upward, the minus Y direction downward, the plus X direction rightward and the minus X direction leftward in FIG. 4. Moreover, the present embodiment will be described on the assumption that the Y direction is vertical and perpendicular to the disk surface of the disk medium 22 and that the X direction is horizontal. For this reason, if vibrations occur in the hologram apparatus and the disk medium 22, the analog electric signal (X) output from the PSD 33 represents the amplitude level of the vibrations of the servo laser beam in the X direction, namely, the horizontal vibrations. In contrast, the analog electric signal (Y) output from the PSD 33 represents the amplitude level of the vibrations of the servo laser beam in the Y direction, namely, the vertical vibrations.

The coupling capacitor 36 cuts the DC component of the analog electric signal (X) from the PSD 33 to output the AC component (signal component) of the analog electric signal (X) to the differentiation circuit 38.

The reference voltage generation unit 40 outputs a preset-valued voltage to the differentiation circuit 38 to superpose this preset-valued voltage on the AC component of the analog electric signal (X) from the coupling capacitor 36. This preset voltage value is a given voltage level determined to allow the comparator 42 to compare the voltage value corresponding to the differentiation result from the differentiation circuit 38 described later and a reference voltage Vref (X).

The differentiation circuit 38 differentiates the AC component of the analog electric signal (X) from the coupling capacitor 36 having superposed thereon the preset-valued voltage from the reference voltage generation unit 40 to output a voltage signal representing the differentiation result to the comparator 42. The voltage signal representing the differentiation result output from the differentiation circuit 38 indicates the rate of change in the analog electric signal (X) when vibrations occur. That is, if the hologram apparatus and the disk medium 22 develop horizontal vibrations, it becomes apparent, from the voltage signal representing the differentiation result from the differentiation circuit 38, that vibrations are occurring. Furthermore, the magnitude of change in the amplitude level of the horizontal vibrations can be found from the level of the voltage signal indicating the differentiation result from the differentiation circuit 38. Therefore, for example, if the voltage indicating the differentiation result output from the differentiation circuit 38 is at 0 (V) this means that the hologram apparatus and the disk medium 22 is not experiencing any horizontal vibrations.

The comparator 42 receives the voltage representing the differentiation result from the differentiation circuit 38. The comparator 42 is also fed with the reference voltage Vref (X) from the DSP 31. The comparator 42 outputs a logical value of '1' to the logical OR circuit (hereinafter referred to as OR circuit) 44 if the voltage representing the differentiation result from the differentiation circuit 38 is higher in level than the reference voltage Vref (X) from the DSP 31. This reference voltage Vref (X) fed from the DSP 31 is a voltage level corresponding to the maximum of amplitude levels that allow the spacing between the interference fringes formed on the disk medium 22 to be smaller than or equal to a given value (e.g., minimum spacing being 316.5 nm in the case of using a helium-neon laser as the laser beam) if the hologram apparatus and the disk medium 22 are caused to vibrate horizontally at the amplitude level, for example, in experiments. Therefore, if the voltage indicating the differentiation result from the differentiation circuit 38 is higher in level than the reference voltage Vref (X), the spacing between the interference fringes formed on the disk medium 22 will exceed the given value. It is to be noted that when the voltage indicating the differentiation result from the differentiation circuit 38 is lower in level than the reference voltage Vref (X) from the DSP 31, the comparator 42 outputs the other logical value of '0' to the OR circuit 44. It is also to be noted that while, in the present embodiment, the reference voltage Vref (X) is set on the assumption that the spacing between the interference fringes formed on the disk medium 22 will exceed the given value if the voltage indicating the differentiation result is higher in level than the reference voltage Vref (X), the present invention is not limited thereto. For example, the reference voltage Vref (X) may be set to a lower level than that in the present embodiment. This allows to prevent more certainly the formation of the interference fringes whose spacing being larger than the given value.

The ADC 34 converts the analog electric signal (X) from the PSD 33 to the digital signal (hereinafter referred to as digital data P (X)) corresponding to the analog electric signal (X) to send this digital data P (X) to the DSP 31. The digital data P (X) sent from the ADC 34 represents the amplitude level of the horizontal vibrations as described earlier.

The coupling capacitor 37 cuts the DC component of the analog electric signal (Y) from the PSD 33 to output the AC component (signal component) of the analog electric signal (Y) to the differentiation circuit 39.

The reference voltage generation unit 41 outputs a preset-valued voltage to the differentiation circuit 39 to superpose this preset-valued voltage on the AC component of the analog electric signal (Y) from the coupling capacitor 37, as with the aforementioned reference voltage generation unit 40. This preset voltage value is a given voltage level determined to allow the comparator 43 to compare the voltage value corresponding to the differentiation result from the differentiation circuit 39 described later and a reference voltage Vref (Y).

The differentiation circuit 39 differentiates the AC component of the analog electric signal (Y) from the coupling capacitor 37 having superposed thereon the preset-valued voltage from the reference voltage generation unit 41 to output the voltage signal representing the differentiation result to the comparator 43, as with the aforementioned differentiation circuit 38. The voltage signal representing the differentiation result output from the differentiation circuit 39 indicates the rate of change in the analog electric signal (Y) when vibrations occur. That is, if the hologram apparatus and the disk medium 22 develop vertical vibrations, it becomes apparent, from the voltage signal representing the differentiation result from the differentiation circuit 39, that vibrations are occurring. Furthermore, the magnitude of change in the amplitude level of the vertical vibrations can be found from the level of the voltage signal indicating the differentiation result from the differentiation circuit 39. Therefore, for example, if the voltage indicating the differentiation result output from the differentiation circuit 39 is at 0 (V), this means that the hologram apparatus and the disk medium 22 is not experiencing any vertical vibrations.

The comparator 43 receives the voltage signal representing the differentiation result from the differentiation circuit 39, as with the aforementioned comparator 42. The comparator 43 is also fed with the reference voltage Vref (Y) from the DSP 31. The comparator 43 outputs the logical value of '1' to the OR circuit 44 if the voltage representing the differentiation result from the differentiation circuit 39 is higher in level than the reference voltage Vref (Y) from the DSP 31. This reference voltage Vref (Y) fed from the DSP 31 is a voltage level corresponding to the maximum of amplitude levels that allow the spacing between the interference fringes formed on the disk medium 22 to be smaller than or equal to a given value if the hologram apparatus and the disk medium 22 are caused to vibrate vertically at the amplitude level, for example, in experiments. Therefore, if the voltage indicating the differentiation result from the differentiation circuit 39 is higher in level than the reference voltage Vref (Y), the spacing between the interference fringes formed on the disk medium 22 will exceed the given value. It is to be noted that when the voltage indicating the differentiation result from the differentiation circuit 39 is lower in level than the reference voltage Vref (Y) from the DSP 31, the comparator 43 outputs the other logical value of '0' to the OR circuit 44. It is also to be noted that while, in the present embodiment, the reference voltage Vref (Y) is set on the assumption that the spacing between the interference fringes formed on the disk medium 22 will exceed the given value if the voltage indicating the differentiation result is higher in level than the reference voltage Vref (Y), the present invention is not limited thereto. For example, the reference voltage Vref (Y) may be set to a lower level than that in the present embodiment. This allows to prevent more certainly the formation of the interference fringes whose spacing being larger than the given value.

The ADC 35 converts the analog electric signal (Y) from the PSD 33 to the digital signal (hereinafter referred to as digital data P (Y)) corresponding to the analog electric signal (Y) to send this digital data P (Y) to the DSP 31, as with the aforementioned ADC 34. The digital data P (Y) sent from the ADC 35 represents the amplitude level of the vertical vibrations as described earlier. Note that in the present embodiment it is assumed that the bit resolution of the ADC 35 to convert the analog electric signal (Y) from the PSD 33 to the digital data P (Y) is the same as that of the ADC 34 to convert the analog electric signal (X) from the PSD 33 to the digital data P (X).

The OR circuit 44 outputs the logical value of '1' to the DSP 31 and the OR circuit 45 when the output from the comparator 42 or 43 is the logical value of '1', and also when the outputs from both of the comparators 42 and 43 are the logical value of '1.'

The OR circuit 45 outputs the logical value of '1' to the TFF 32 when the output from the OR circuit 44 or the DSP 31 is the logical value of '1' and also when the outputs from both the OR circuit 44 and the DSP 31 are the logical value of '1.'

The TFF 32 has T (trigger input), R (reset) and Q (output) terminals. A trigger signal from the DSP 31 is fed to the T terminal of the TFF 32. Upon receiving a trigger signal input from the DSP 31, the TFF 32 outputs, e.g., a high level through the Q terminal to open the first shutter 11. The first shutter 11 remains open while the high level is output from the TFF 32. On the other hand, when the logical value of '1' is input to the R terminal of the TFF 32 from the OR circuit 45, the TFF 32 outputs, e.g., a low level through the Q terminal to close the first shutter. The first shutter 11 remains closed while the low level is output from the TFF 32.

The DSP 31, upon receiving a recording instruction signal from the CPU 1, resets the time count of the first timer 46 to start the time count. The DSP 31, upon receiving page data from the CPU 1, calculates a laser beam irradiation time T appropriate to the page data, obtained through experiments or the like, according to the computing program stored in advance in the memory (not shown). Such laser beam irradiation times T represent the laser beam irradiation times appropriate to the respective pages in the angle-multiplexed recording. That is, when the laser beam is irradiated into the disk medium 22 for the laser beam irradiation time T for each page, the spacing between the interference fringes formed on the disk medium 22 is smaller than or equal to the given value. It is to be noted that while the DSP 31, upon receiving a page of data, calculates the laser beam irradiation time T appropriate to the page of data in the present embodiment, the present invention is not limited thereto. For example, the laser beam irradiation times T appropriate to the respective pages of data may be stored in the memory in advance as table data so that upon receiving a page of data from the CPU 1, the DSP can read out the laser beam irradiation time T appropriate to that page of data. The DSP 31 outputs the reference voltage Vref (X) to the comparator 42 and the reference voltage Vref (Y) to the comparator 43. Also, the DSP 31 outputs a trigger signal to the TFF 32 upon receiving a recording instruction signal from the CPU 1. The DSP 31 determines whether the time count of the first timer 46 has reached the laser beam irradiation time T. The DSP 31 outputs the logical value of '1' to the OR circuit 45 when it determines that the time count of the first timer 46 has reached the laser beam irradiation time T. The DSP 31 also outputs to the CPU 1 the determination result that the time count of the first timer 46 has reached the laser beam irradiation time T. When the logical value of '1' is input from the OR circuit 44, the DSP 31 stops the time count of the first timer 46. The DSP 31 determines whether the digital data P (X) is at a given level I (X) or less each time it receives the data from the ADC 34. If the DSP 31 determines that the digital data P (X) from the ADC 34 is not at the given level I (X) or less, it resets the second timer 47 at the falling edge of the digital data P (X), for example, to start the time count. The DSP 31 determines whether the time count of the second timer 47 has reached a preset time t (X). It is to be noted that this given level I (X) is a given amplitude level of horizontal vibrations corresponding, for example, to the reference voltage Vref (X). That is, even if vibrations occur at the amplitude of the given level I (X) during the formation of the interference fringes (during the laser beam irradiation), the spacing between the interference fringes formed during this period will be smaller than or equal to the given value. The DSP 31 determines whether the digital data P (Y) is at a given level I (Y) or less each time it receives the data from the ADC 35. If the DSP 31 determines that the digital data P (Y) from the ADC 35 is not at the given level I (Y) or less, it resets the third timer 48 at the falling edge of the digital data P (Y), for example, to start the time count. The DSP 31 determines whether the time count of the third timer 48 has reached a preset time t (Y). It is to be noted that this given level I (Y) is a given amplitude level of vertical vibrations corresponding, for example, to the reference voltage Vref (Y). That is, even if vibrations occur at the amplitude of the given level I (Y) during the formation of the interference fringes (during the laser beam irradiation), the spacing between the interference fringes during this period will be smaller than or equal to the given value. When determining that the time count of the second timer 47 has reached the preset time t (X) and that the time count of the third timer 48 has reached the preset time t (Y), the DSP 31 restarts the time count of the first timer 46 and outputs a trigger signal to the TFF 32.

The first, second and third timers 46, 47 and 48 start their time count on the basis of an instruction signal from the DSP 31. On the other hand, the first, second and third timers 46, 47 and 48 stop their time count on the basis of an instruction signal from the DSP 31. The first timer 46 is provided, as described above, to allow the DSP 31 to determine whether the laser beam has been irradiated into the disk medium 22 for the laser beam irradiation time T appropriate to the page data. The second timer 47 is provided, as described above, to count for the preset time t (X) from when the DSP 31 determines that the digital data P (X) is not at the given level I (X) or less. That is, the fact that the second timer 47 has counted for the preset time t (X) means that the period of time during which the digital data P (X) does not exceed the given level I (X) has lasted for the time t (X). Therefore, this indicates that the horizontal vibrations have calmed down to the given amplitude level or less. Consequently, it is apparent that the horizontal vibrations are again at an amplitude level that permits the irradiation of the laser beam into the disk medium 22. The third timer 48 is provided, as described above, to count for the preset time t (Y) from when the DSP 31 determines that the digital data P (Y) is not at the given level I (Y) or less. That is, the fact that the third timer 48 has counted for the preset time t (Y) means that the period of time during which the digital data P (Y) does not exceed the given level I (Y) has lasted for the time t (Y). Therefore, this indicates that the vertical vibrations have calmed down to the given amplitude level or less. Consequently, it is apparent that the vertical vibrations are again at an amplitude level that permits the irradiation of the laser beam into the disk medium 22.

The Fourier transform lens 26 receives the beam (hereinafter referred to as reproduction beam) diffracted by the hologram recorded in the hologram recording medium 22 when the second reference beam is applied to the hologram recording medium 22 during the hologram reproduction. It is to be noted that the incidence angle of the second reference beam during the reproduction of a hologram must be the same as that of the second reference beam during the recording of the hologram. Then, the Fourier transform lens 26 emits the reproduction beam inverse-Fourier-transformed to the image sensor 27.

The image sensor 27 is irradiated by the inverse-Fourier-transformed reproduction beam from the Fourier transform lens 26. The image sensor 27 is constituted by, for example, a CCD (Charge Coupled Device) or CMOS (Complementary Metal Oxide Semiconductor) image sensor to reproduce the two-dimensional contrast image pattern from the reproduction beam. The image sensor 27 converts lightness/darkness in each reproduced two-dimensional contrast image pattern to being strong/weak in electric signal intensity to send to the filter 29 an analog electric signal having levels corresponding to the light intensities of lightness and darkness in each two-dimensional contrast image pattern. In the present embodiment, if the image sensor control unit 28 determines that the image sensor 27 has been irradiated by the reproduction beam with the given light intensity or greater, the image sensor control unit 28 sends an instruction signal to the first shutter control unit 12 to close the first shutter 11. It is assumed that the SLM 9 and the image sensor 27 can both produce two-dimensional contrast image patterns with the same 1280 pixels by 1280 pixels. It is to be noted that while the SLM 9 and the image sensor 27 have the same pixel count, the present invention is not limited thereto. For example, more pixels may be provided in the image sensor 27 than in the SLM 9. More pixels in the image sensor 27 than in the SLM 9 ensure the irradiation of the reproduction beam from the Fourier transform lens 26 onto the image sensor 27, thus allowing the positive reproduction of the two-dimensional contrast image pattern. Furthermore, more pixels in the image sensor 27 lighten the need for the image sensor control unit 28 to move the image sensor 27 to a given position highly precisely.

The filter 29 filters the analog electric signal that is based on the lightness/darkness in the two-dimensional contrast image pattern reproduced by the image sensor 27 to enhance the separability in the binarization process. For example, the two-dimensional contrast image pattern reproduced by the image sensor 27 may not be as clear in lightness/darkness as the two-dimensional contrast image pattern formed by the SLM 9 due, for example, to noise to which the data and reproduction beams are subjected. This may make it unclear whether the analog electric signal based on the lightness/darkness in the two-dimensional contrast image pattern reproduced by the image sensor 27 is at a level representing 'lightness' or 'darkness', thus leading to an in appropriate binarization process. For this reason, the filtering is conducted by the filter 29 to correct the level of the analog electric signal. It is to be noted that a binarization process unit (not shown) is provided between the filter 29 and the decoder 30 to perform the binarization process on the analog electric signal from the filter 29 in the present embodiment. A description will be given below on the assumption that the digital signal obtained as a result of the binarization process is sent to the decoder 30.

The decoder 30 carries out the decoding process on the digital signal from the binarization process unit.

The detector 23 receives the servo laser beam from the servo laser device 19 having irradiated pits representing address information formed in the hologram recording medium 22. The detector 23 is, for example, constituted by a four-part photodiode (not shown) to send the light intensity information of the servo laser beam detected by the four-part photodiode to the disk control unit 24. The detector 23 also sends the address information to the CPU 1 based on the servo laser beam irradiated onto the pits representing the address information. It is to be noted that while the detector 23 is provided in FIG. 1 to receive the servo laser beam that has transmitted through the disk medium 22, the present invention is not limited thereto. For example, if the servo laser beam is reflected by the disk medium 22 after the irradiation onto pits formed on the disk medium 22, the detector 23 may be provided to receive the reflected servo laser beam.

The disk control unit 24 servo controls the disk drive unit 25 based on the light intensity information of the servo laser beam from the detector 23. The disk control unit 24 also sends an instruction signal to the disk drive unit 25 to rotate the disk medium 22 during the reproduction (or recording) so as to irradiate the servo laser beam onto the pits representing desired address information on the disk medium 22, according to the instruction signal from the CPU 1. The disk control unit 24 also sends an instruction signal to the disk drive unit 25 to rotate the disk medium 22 so as to allow the formation of a hologram at another position of the disk medium 22 when the book has been formed on the disk medium 22.

The disk drive unit 25 carries out the tilt correction of the disk medium 22 according to the instruction signal from the disk control unit 24. The disk drive unit 25 also rotates the disk medium 22 according to the instruction signal from the disk control unit 24.

The memory 2 stores in advance the program data used by the CPU 1 to perform the above-described processes. The memory 2 also stores the address information from the pits formed in the hologram recording medium 22. The memory 2 is a non-volatile storage element where data can be repeatedly written and read by electrically deleting data.

<Operation of Vibration Detection Apparatus/Hologram Apparatus>

Figure 5:
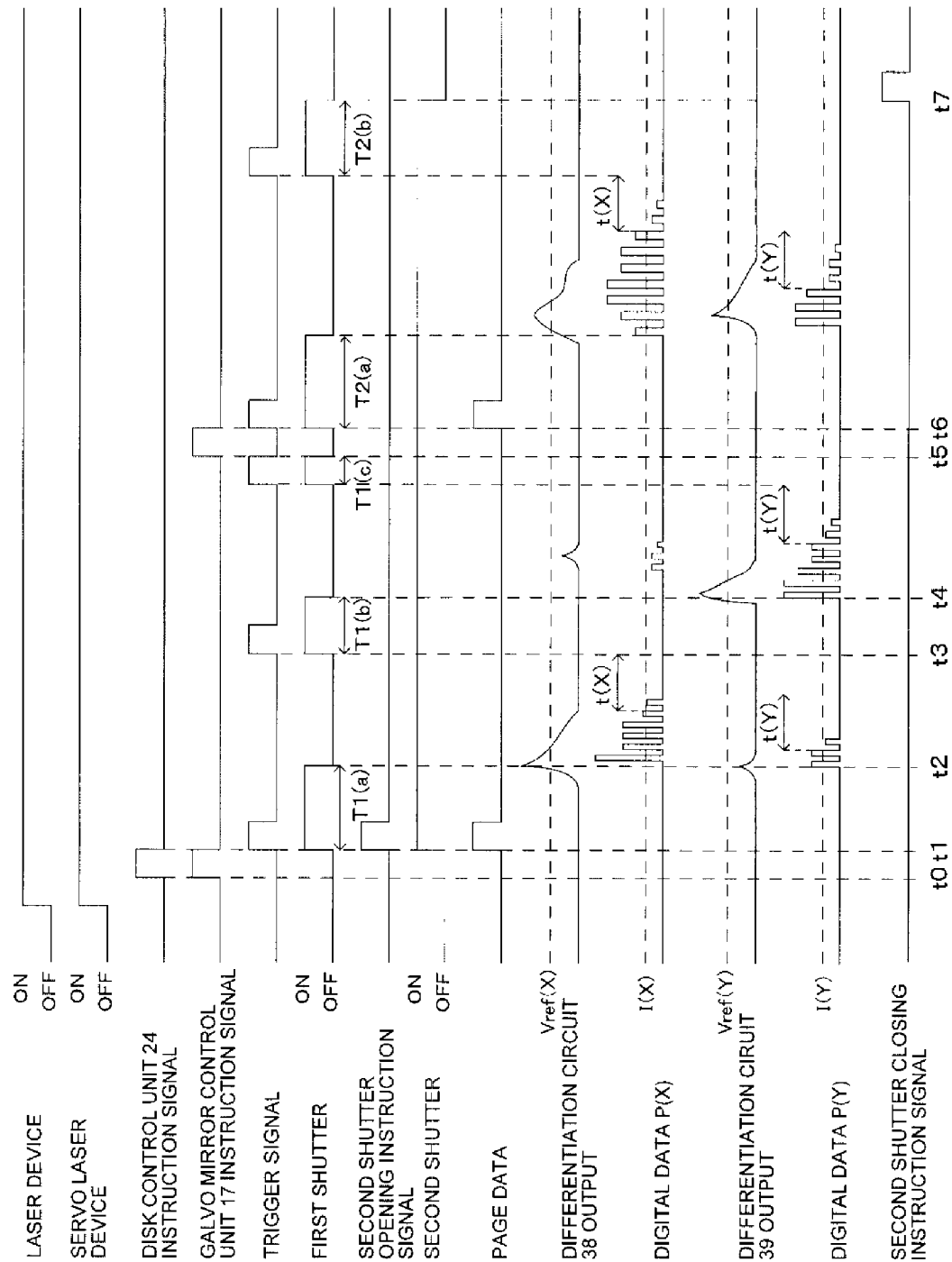
FIG. 5 is a timing chart illustrating an example of the operation of the vibration detection apparatus/hologram apparatus according to the present invention.
Figure 6:
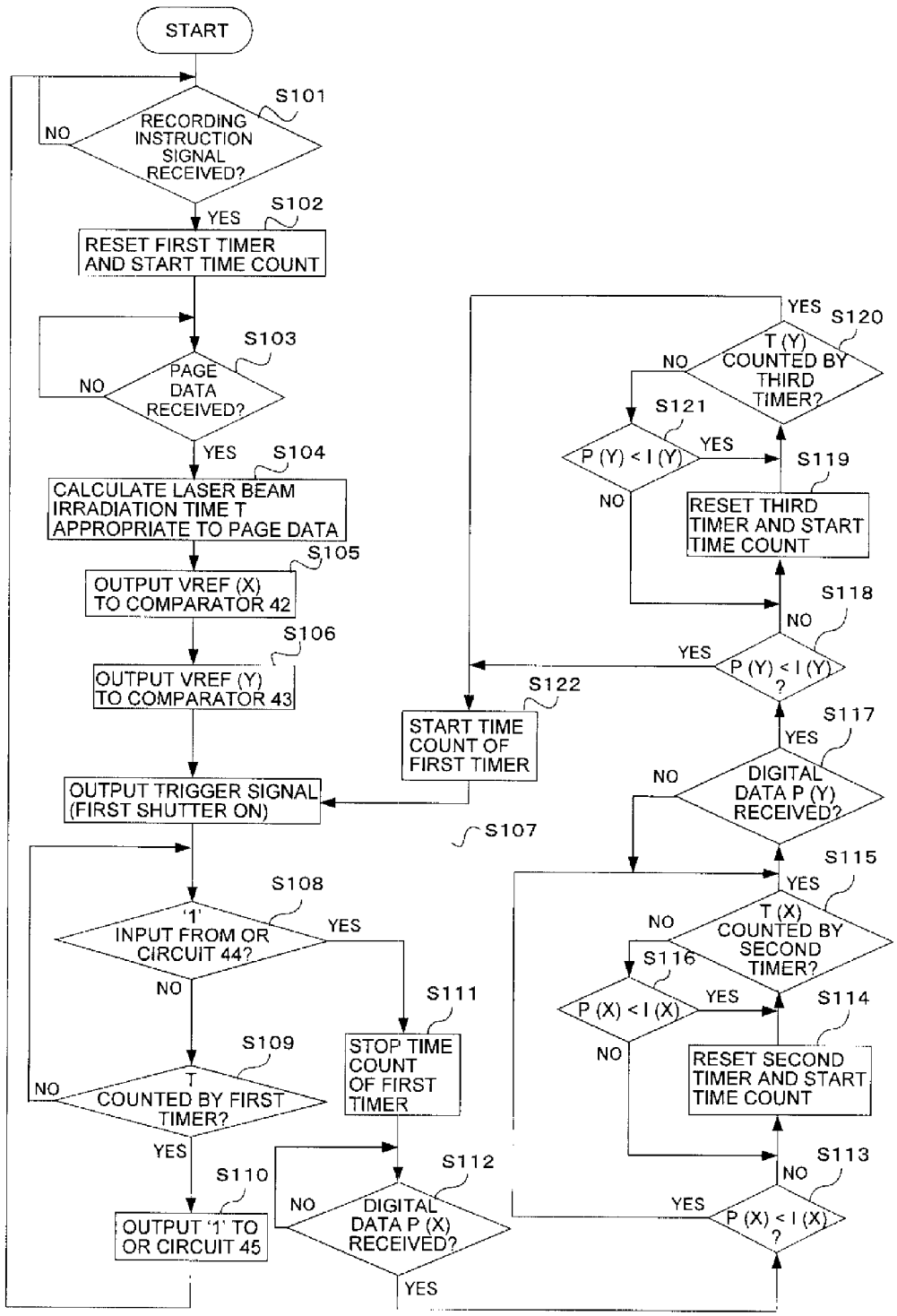
FIG. 6 is a flowchart illustrating an example of the operation of a DSP 31 forming part of the vibration detection apparatus/hologram apparatus according to the present invention.

A description will be given below of the operation of the vibration detection apparatus and the hologram apparatus with reference to FIGS. 1, 5 and 6. FIG. 5 is a timing chart illustrating an example of the operation of the vibration detection apparatus/hologram apparatus according to the present invention. FIG. 6 is a flowchart illustrating an example of the operation of the DSP 31 forming part of the vibration detection apparatus/hologram apparatus according to the present invention. It is to be noted that the following description will be given assuming that no holograms are formed (that is, no data is recorded) on the disk medium 22 in the present embodiment.

For example, when the recording instruction data is stored in the buffer 5 from the host equipment such as a PC via the connection terminal 4 and the interface 3, the reproduction/recording determination unit 6 determines that the recording instruction data is stored in the buffer 5. Then, the reproduction/recording determination unit 6 sends an instruction signal to the CPU 1 to carry out the recording process in the hologram apparatus. It is assumed that the data to be recorded in the disk medium 22 has been sent and stored in the buffer 5 from the host equipment. The reproduction/recording determination unit 6 sends information on the amount of data to be recorded in the disk medium 22 to the CPU 1. Then, the reproduction/recording determination unit 6 sends the data stored in the buffer 5 to be recorded in the disk medium 22 to the encoder 7.

Upon receiving an instruction signal based on the recording instruction data from the reproduction/recording determination unit 6, the CPU 1 reads address information related to the hologram already formed on the disk medium 22 from among the address information stored in the memory 2. It is to be noted that holograms have yet to be formed on the disk medium 22 in the present embodiment as described above. Therefore, the CPU 1 determines that no information is available related to the hologram formed on the disk medium 22. Then, the CPU 1 sends an instruction signal to the galvo mirror control unit 17 and the disk control unit 24 (disk control unit 24 instruction signal (to) and galvo mirror control unit 17 instruction signal (to) in FIG. 5) to start the formation of a hologram, for example, from the position of the disk medium 22 where the first address information is formed in the form of pits. Upon receiving an instruction signal based on the recording instruction data, the CPU 1 also sends a recording instruction signal to the DSP 31. The CPU 1 also sends an instruction signal to the second shutter control unit 15 to open the second shutter 14. Further, the CPU 1 calculates the number of pages to be formed in the disk medium 22 based on the data amount information from the reproduction/recording determination unit 6. In the present embodiment, the following description will be given assuming, for example, that the data amount information indicates three Mbits and that the CPU 1 has calculated the number of pages to be two. Then, the CPU 1 sends the page data (page data (t1) in FIG. 5) corresponding to the first page (first hologram to be formed on the disk medium 22) to the DSP 31 to form the first page on the disk medium 22.

The servo laser device 19 emits the servo laser beam (as denoted by servo laser device in FIG. 5) when the vibration detection apparatus/hologram apparatus starts its operation. This servo laser beam is reflected by the dichroic mirror 18 to apply to the scanner lens 20. After applying to the scanner lens 20, the servo laser beam is irradiated onto the pits representing the address information formed on the disk medium 22 to be applied to the detector 23.

The detector 23 sends the CPU 1 the address information based on the servo laser beam that has been irradiated onto the pits representing the address information and is applied to the four-part photodetector (not shown) making up the detector 23. The detector 23 also sends the light intensity information of the servo laser beam detected by the four-part photodetector to the disk control unit 24.

The CPU 1 determines based on the address information from the detector 23 whether the address information represents the first address information. When determining that the address information does not represent the first address information, the CPU 1 sends an instruction signal to the disk control unit 24 to rotate the disk medium 22 and irradiate the servo laser beam onto pits representing the first address information.

The disk control unit 24 sends an instruction signal to the disk drive unit 25 according to the instruction signal from the CPU 1 to rotate the disk medium 22. The disk control unit 24 also determines based on the light intensity information from the detector 23 whether to carry out the tilt correction of the disk medium 22. The following description will be given assuming that the disk control unit 24 determines that the light intensity of the servo laser beam indicated by the light intensity information from the detector 23 is at a given level or higher and that the tilt correction of the disk medium 22 is not required.

The disk drive unit 25 rotates the disk medium 22 according to the instruction signal from the disk control unit 24.

The encoder 7 carries out the encoding process on the data from the buffer 5.

The mapping process unit 8 rearranges the data from the encoder 7 into a two-dimensional data layout to form page unit layout data. It is to be noted that the present embodiment will be described assuming that the mapping process unit 8 can form page unit layout data from 1638400 bits of data (1280 bits by 1280 bits). For this reason, if the data to be recorded in the disk medium 22 from the host equipment is of three Mbits, the mapping process unit 8 sequentially forms page unit layout data at least twice.

The SLM 9 forms a two-dimensional contrast image pattern (1280 pixels down by 1280 pixels across) from the page unit layout data formed by the mapping process unit 8. For example, the SLM 9 assigns 'lightness' to one of the logical values of the data bits of the page unit layout data and 'darkness' to the other logical value to form a two-dimensional contrast image pattern.

When receiving a recording instruction signal from the CPU 1 (YES in S101) the DSP 31 resets the first timer 46 and starts the time count (S102). When receiving page data from the CPU 1 (YES in S103), the DSP 31 calculates the laser beam irradiation time T appropriate to the page data (S104). That is, the DSP 31 calculates a laser beam irradiation time T1 (laser beam irradiation time T1 in FIG. 5) appropriate to the first page first. Then, the DSP 31 determines whether the time count of the first timer 46 has reached the laser beam irradiation time T1 (S109). Also, the DSP 31 outputs the reference voltage Vref (X) to the comparator 42 (S105). The DSP 31 outputs the reference voltage Vref (Y) to the comparator 43 (S106). Then, the DSP 31 outputs a trigger signal to the TFF 32 to open the first shutter (S107; trigger signal (t1) in FIG. 5).

When receiving a trigger signal from the DSP 31, the TFF 32 outputs a high level to open (turn ON) the first shutter 11 (first shutter (t1) in FIG. 5). The first shutter 11 remains open while a high level is output from the TFF 32. As the first shutter 11 opens, the laser beam from the laser device 10 is applied to the 1/2 wavelength plate 49 via the first shutter 11.

The 1/2 wavelength plate 49 applies the laser beam from the laser device 10 to the PBS 13 at the angle corresponding to the given inclination.

The PBS 13 splits the laser beam from the 1/2 wavelength plate 49 into one laser beam and a reference beam to apply the one laser beam to the second shutter 14 and the reference beam to the galvo mirror 16.

The second shutter control unit 15 sends an opening instruction signal to the second shutter 14 according to the instruction signal from the CPU 1 (second shutter opening instruction signal (t1) in FIG. 5).

The second shutter 14 opens (turns ON) according to the opening instruction signal from the second shutter control unit 15 (second shutter (t1) in FIG. 5). As the second shutter 14 opens, the laser beam from the PBS 13 is applied to the SLM 9.

When receiving the laser beam, the SLM 9 reflects the one laser beam to the Fourier transform lens 21 as a data beam reflecting the information of the two-dimensional contrast image pattern formed in the SLM 9.

The Fourier transform lens 21 Fourier-transforms the data beam collecting the data beam from the SLM 9 and applies the Fourier-transformed beam to the disk medium 22.

The galvo mirror control unit 17 adjusts the angle of the galvo mirror 16 so as to adjust the angle for the reference beam, reflected by the galvo mirror 16, to apply to the disk medium 22 via the dichroic mirror 18 and the scanner lens 20, according to the instruction signal from the CPU 1. It is to be noted that this angle adjustment of the galvo mirror 16 by the galvo mirror control unit 17 is conducted to form the first page on the disk medium 22 as described earlier. Then, the reference beam from the PBS 13 is reflected by the galvo mirror 16, adjusted in angle by the galvo mirror control unit 17, to apply to the dichroic mirror 18.

The reference beam incident upon the dichroic mirror 18 transmits through this mirror to be applied to the scanner lens 20. It is to be noted that the servo laser beam emitted from the servo laser device 19 is superposed on the reference beam to apply to the scanner lens 20.

The scanner lens 20 refracts the reference beam from the dichroic mirror 18 and the servo laser beam to be incident on the disk medium 22.

A description will be given below of the case where the hologram apparatus and the disk medium 22 are free of vibrations.

Part of the servo laser beam incident upon the disk medium 22 is repeatedly reflected within the disk medium 22 by the glass substrates forming part of the disk medium 22 and emitted from the end face of the disk medium 22 and then is applied to the PSD 33.

The PSD 33 outputs the analog electric signal (X) corresponding to the position in the X direction of the diameter of the incident servo laser beam to the coupling capacitor 36 and the ADC 34. The PSD 33 also outputs the analog electric signal (Y) corresponding to the position in the Y direction of the diameter of the incident servo laser beam to the coupling capacitor 37 and the ADC 35.

The coupling capacitor 36 cuts the DC component of the analog electric signal (X) from the PSD 33 to output the AC component (signal component) of the analog electric signal (X) to the differentiation circuit 38. In the same manner, the coupling capacitor 37 cuts the DC component of the analog electric signal (Y) from the PSD 33 to output the AC component (signal component) of the analog electric signal (Y) to the differentiation circuit 39.

The differentiation circuit 38 differentiates the AC component of the analog electric signal (X) having superposed thereon the preset-valued voltage from the reference voltage generation unit 40 to output the voltage signal representing the differentiation result to the comparator 42. It is to be noted that the hologram apparatus and the disk medium 22 are free of vibrations at this time, and therefore, the voltage signal representing the differentiation result of the differentiation circuit 38 is at, for example, 0 (V). In the same manner, the differentiation circuit 39 differentiates the AC component of the analog electric signal (Y) having superposed thereon the preset-valued voltage from the reference voltage generation unit 41 to output the voltage signal representing the differentiation result to the comparator 43. It is to be noted that the hologram apparatus and the disk medium 22 are free of vibrations at this time, and therefore, the voltage signal representing the differentiation result of the differentiation circuit 39 is at, for example, 0 (V).

The comparator 42 receives the reference voltage Vref (X) from the DSP 31 and the voltage signal representing the differentiation result from the differentiation circuit 38. The comparator 42 determines by comparison whether the voltage representing the differentiation result from the differentiation circuit 38 is higher in level than the reference voltage Vref (X). It is to be noted that the voltage of 0 (V) of the differentiation result from the differentiation circuit 38 is lower in level than the reference voltage Vref (X) (see the output of the differentiation circuit 38 between t1 and t2 in FIG. 5). Therefore, the comparator 42 outputs the other logical value of '0' to the OR circuit 44. In the same manner, the comparator 43 receives the reference voltage Vref (Y) from the DSP 31 and the voltage representing the differentiation result from the differentiation circuit 39. The comparator 43 determines by comparison whether the voltage representing the differentiation result from the differentiation circuit 39 is higher in level than the reference voltage Vref (Y). It is to be noted that the voltage of 0 (V) of the differentiation result from the differentiation circuit 39 is lower in level than the reference voltage Vref (Y) (see the output of the differentiation circuit 39 between t1 and t2 in FIG. 5). Therefore, the comparator 43 outputs the other logical value of '0' to the OR circuit 44.

The outputs from both of the comparators 42 and 43 are at the other logical value of '0.' Therefore, the OR circuit 44 outputs the other logical value of '0' to the OR circuit 45 and the DSP 31.

The DSP 31 outputs the other logical value of '0' to the OR circuit 45 until it determines that the time count of the first timer 46 has reached the laser beam irradiation time T1. The outputs from both of the OR circuit 44 and the DSP 31 are at the other logical value of '0.' Therefore, the OR circuit 45 outputs the other logical value of '0' to the TFF 32.

The TFF 32 does not respond when it receives the other logical value of '0' from the OR circuit 45 and instead continues to output a high level to the first shutter 11 as described earlier.

Thus, when the hologram apparatus and the disk medium 22 are free of vibrations, the voltage representing the differentiation result from the differentiation circuit 38 is lower in level than the reference voltage Vref (X), and the voltage representing the differentiation result from the differentiation circuit 39 is lower in level than the reference voltage Vref (Y). Therefore, the first shutter 11 does not close (turn OFF), and the hologram apparatus continues with the recording process.

A description will be given next of the case where vibrations occur in the hologram apparatus and the disk medium 22. It is assumed that the amplitude level of horizontal vibrations taking place at this time is such that the voltage representing the differentiation result from the differentiation circuit 38 is higher in level than the reference voltage Vref (X), as shown at t2 in FIG. 5.

As described earlier, part of the servo laser beam incident upon the disk medium 22 leaves the disk medium 22 from the end face thereof to apply to the PSD 33 in a horizontally and vertically vibrating condition of the disk medium 22 (hereinafter vibrating condition for short).

The PSD 33 outputs the analog electric signal (X) corresponding to the position in the X direction of the diameter of the servo laser beam applying to the PSD 33 in the vibrating condition to the coupling capacitor 36 and the ADC 34. The PSD 33 also outputs the analog electric signal (Y) corresponding to the position in the Y direction of the diameter of the servo laser beam striking the PSD 33 in the vibrating condition to the coupling capacitor 37 and the ADC 35. It is to be noted that the analog electric signal (X) output from the PSD 33 at this time represents the amplitude level of horizontal vibrations (see FIG. 4), whereas the analog electric signal (Y) represents the amplitude level of vertical vibrations, as described earlier.

The coupling capacitor 36 cuts the DC component of the analog electric signal (X) from the PSD 33 to output the AC component (signal component) of the analog electric signal (X) to the differentiation circuit 38. In the same manner, the coupling capacitor 37 cuts the DC component of the analog electric signal (Y) from the PSD 33 to output the AC component (signal component) of the analog electric signal (Y) to the differentiation circuit 39.

The differentiation circuit 38 differentiates the AC component of the analog electric signal (X) having superposed thereon the preset-valued voltage from the reference voltage generation unit 40 to output the voltage signal representing the differentiation result to the comparator 42. It is to be noted that the voltage level representing the differentiation result at this time is the level shown by the output of the differentiation circuit 38 (t2) in FIG. 5. In the same manner, the differentiation circuit 39 differentiates the AC component of the analog electric signal (Y) having superposed thereon the preset-valued voltage from the reference voltage generation unit 41 to output the voltage signal representing the differentiation result to the comparator 43. It is to be noted that the voltage level representing the differentiation result at this time is the level shown by the output of the differentiation circuit 39 (t2) in FIG. 5.

The comparator 42 determines by comparison whether the voltage representing the differentiation result from the differentiation circuit 38 is higher in level than the reference voltage Vref (X) from the DSP 31. The comparator 42 determines at this time that the voltage representing the differentiation result from the differentiation circuit 38 is higher in level than the reference voltage Vref (X) from the DSP 31 thus outputting the logical value of '1' to the OR circuit 44. In the same manner, the comparator 43 determines by comparison whether the voltage representing the differentiation result from the differentiation circuit 39 is higher in level than the reference voltage Vref (Y) from the DSP 31. The comparator 43 determines at this time that the voltage representing the differentiation result from the differentiation circuit 39 is lower in level than the reference voltage Vref (Y) from the DSP 31 thus outputting the other logical value of '0' to the OR circuit 44.

The output from the comparator 42 is at the logical value of '1.' Therefore, the OR circuit 44 outputs the logical value of '1' to the OR circuit 45 and the DSP 31.

The output from the OR circuit 44 is at the logical value of '1.' Therefore, the OR circuit 45 outputs the logical value of '1' to the TFF 32.

Upon receiving the logical value of '1' from the OR circuit 45, the TFF 32 outputs a low level to the first shutter 11 to close (turn OFF) this shutter (first shutter (t2) in FIG. 5). The first shutter 11 remains closed while a low level is output from the TFF 32. This hinders the laser beam from the laser device 10 from applying to the 1/2 wavelength plate 49. That is, the reference and data beams are no longer incident upon the disk medium 22, thus stopping the formation of interference fringes.

Upon receiving the logical value of '1' from the OR circuit 44 (YES in S108), the DSP 31 stops the time count of the first timer 46 (S111). The DSP 31 receives the digital data P (X) from the ADC 34 (YES in S112). Then, the DSP 31 determines whether the digital data P (X) from the ADC 34 is at the given level I (X) or less (S113). It is to be noted that the digital data P (X) represents the amplitude level of the horizontal vibrations as described earlier. In the presence of the horizontal vibrations, therefore, the digital data P (X) is at the level shown at (t2) in FIG. 5. When determining that the digital data P (X) from the ADC 34 is not at the given level I (X) or less (NO in S113), the DSP 31 starts the time count of the second timer 47 at the falling edge of the digital data P (X) (S114). Then, the DSP 31 determines whether the time count of the second timer 47 has reached the preset time t (X) (S115). In the same manner, the DSP 31 receives the digital data P (Y) from the ADC 35 (YES in S117). The DSP 31 determines whether the digital data P (Y) from the ADC 35 is at the given level I (Y) or less (S118). It is to be noted that the digital data P (Y) represents the amplitude level of the vertical vibrations as described earlier. When determining that the digital data P (Y) from the ADC 35 is not at the given level I (Y) or less (NO in S118), the DSP 31 starts the time count of the third timer 48 at the falling edge of the digital data P (Y) (S119). Then, the DSP 31 determines whether the time count of the third timer 48 has reached the preset time t (Y) (S120). When determining that the time count of the second timer 47 has reached the preset time t (X) and that the time count of the third timer 48 has reached the preset time t (Y) (YES in S120), the DSP 31 restarts the first timer 46 (S122) and outputs a trigger signal to the TFF 32 (S107; trigger signal (t3) in FIG. 5). It is to be noted that if the DSP 31 receives the next digital data P (X) before the time count of the second timer 47 reaches the preset time t (X), the DSP 31 determines whether the next digital data P (X) is at the given level I (X) or less (S116). Then, when determining that the next digital data P (X) is not at the given level I (X) or less (NO in S116), the DSP 31 resets the second timer 47 again at the falling edge of the next digital data P (X) to start the time count (S114). When determining that the next digital data P (X) is at the given level I (X) (YES in S116), the DSP 31 continues with the time count of the second timer 47. The same is true with the next digital data P (Y). It is to be noted that the digital data P (X) and P (Y) sent to the DSP 31 from the ADCs 34 and 35 are binary data expressed by combinations of the logical values of '1' and '0' and that, for convenience of description, the digital data P (X) and P (Y) are illustrated by levels corresponding to the respective binary data in FIG. 5.

When receiving a trigger signal from the DSP 31, the TFF 32 outputs a high Level to open (turn ON) the first shutter 11 (first shutter (t3) in FIG. 5). The first shutter 11 remains open while a high level is output from the TFF 32. This allows the laser beam from the laser device 10 to apply to the 1/2 wavelength plate 49 again. That is, the reference and data beams are once again incident upon the disk medium 22, thus initiating the formation of interference fringes representing the first page. Then, the aforementioned process of forming interference fringes representing the first page continues until t4 in FIG. 5 when vibrations start to occur on the hologram apparatus and the disk medium 22. And, the same process is conducted in the case where vertical vibrations occur from t4 in FIG. 5 in the hologram apparatus and the disk medium 22 as in the case of the vibrations whose amplitude level is shown at t2 in FIG. 5.

The DSP 31 repeatedly starts and stops the first timer 46 as described earlier, and when determining that the time count of the first timer 46 has reached the laser beam irradiation time T1 (T1(a)+T1(b)+T1(c) in FIG. 5) (YES in S109), the DSP 31 outputs the logical value of '1' to the OR circuit 45 (S110). The DSP 31 also sends the CPU 1 the determination result of the DSP 31 that the time count of the first timer 46 had reached the laser beam irradiation time T1.

The output from the DSP is at the logical value of '1.' Therefore, the OR circuit 45 outputs the logical value of '1' to the TFF 32.

Upon receiving the logical value of '1' from the OR circuit 45, the TFF 32 outputs a low level to close (turn OFF) the first shutter 11 (first shutter (t5) in FIG. 5). The first shutter 11 remains closed while a low level is output from the TFF 32.

The CPU 1 determines based on the determination result from the DSP 31 that the first page has been formed on the disk medium 22, and sends again the recording instruction signal to the DSP 31 to form the second page (second hologram to be formed in the disk medium 22) in the disk medium 22. Also, the CPU 1 sends an instruction signal (galvo mirror control unit 17 instruction signal (t5) in FIG. 5) to the galvo mirror control unit 17 to vary the angle of the galvo mirror 16 so as to carry out the angle-multiplexed recording. Further, the CPU 1 sends the page data corresponding to the second page to the DSP 31.

Then, the second page is formed in the disk medium 22 as in the process of recording the first page in the disk medium 22.

When receiving the determination result from the DSP 31 after the formation of the second page in the disk medium 22, the CPU 1 determines that as many holograms have been formed in the disk medium 22 as the number of pages calculated based on the data amount information from the reproduction/recording determination unit 6. Therefore, the CPU 1 sends an instruction signal to the second shutter control unit 15 to close the second shutter 14.

The second shutter control unit 15 sends a closing instruction signal to the second shutter 14 according to the instruction signal from the CPU 1 (second shutter closing instruction signal (t7) in FIG. 5).

The second shutter 14 closes according to the closing instruction signal from the second shutter control unit 15 (second shutter (t7) in FIG. 5).

In this way, the data and reference beams are irradiated into the disk medium 22 until the first timer 46 counts for the laser beam irradiation time T corresponding to the first page (or second page). Therefore, the interference fringes are formed with spacing smaller than or equal to the given value in the hologram recording medium. On the other hand, if vibrations of the given amplitude level occur during the irradiation of the data and reference beams into the disk medium 22, the differentiation circuits 38 and 39 can calculate the rate of change in the servo laser beam detected by the PSD 33 due to the vibrations. As a result, the first shutter can be closed. Also, the DSP 31 compares the actual and given amplitude levels of vibrations. This makes it possible to determine whether the vibrations in the hologram apparatus and the disk medium 22 have receded down to the given amplitude level. Therefore, interference fringes can be formed with spacing smaller than or equal to the given value even in the event of vibrations in the hologram apparatus and the disk medium 22.

According to the aforementioned embodiment, the laser beam control is carried out by the hardware, namely, the coupling capacitors 36 and 37, differentiation circuits 38 and 39, reference voltage generation units 40 and 41, comparators 42 and 43, OR circuits 44 and 45, and TFF 32, based on the analog electric signals (X) and (Y) from the PSD 33, but the present invention is not limited thereto. The aforementioned processes can be implemented by software based on the digital data P (X) and P (Y) from the ADCs 34 and 35 if the DSP 31 can handle the processes.

According to the above embodiment, even in the event of vibrations in the disk medium 22 and the hologram apparatus, the vibrations can be prevented from affecting the holograms that should be formed with precise spacing.

In the event of vibrations in the disk medium 22 and the hologram apparatus, the voltage signals representing the differentiation results from the differentiation circuits 38 and 39 allow for the effective calculation of the rate of change in the analog electric signal (X). This ensures a positive detection of the occurrence of vibrations and allows for the formation of holograms with precise spacing, thus preventing the formation of holograms with incorrect spacing due to the vibrations.

The amplitude level of vibrations can be detected when the vibrations continue in the disk medium 22 and the hologram apparatus. This makes it possible to permit the formation of holograms if the vibrations recede down to the amplitude level permissible to form holograms with precise spacing.

When the first timer 46 has counted for the laser beam irradiation time T1, the first shutter 1 is closed. This allows the data and reference beams to be continuously irradiated into the disk medium 22, thus forming holograms with a given diffraction efficiency.

A hologram can be formed which contains the number of pages calculated by the CPU 1 from the data from the host equipment. Moreover, each hologram can be provided with a given diffraction efficiency. This prevents the formation of holograms with a diffraction efficiency under the given value, thus allowing control over the monomer consumption.

With only the first shutter 11 provided, the laser beam can be interrupted. This ensures a reduced shutter cost and prevents complication in the hologram apparatus configuration.

The tilt correction can be realized using the servo laser beam. This eliminates the need for a new beam for the tilt correction, thus reducing the cost and preventing complexity in the hologram apparatus configuration.

In the event of vibrations in the disk medium 22 and the hologram apparatus, by receiving the servo laser beam from the end face of the disk medium 22 susceptible to the effect of the vibrations. The occurrence of vibrations can be detected certainly.

Further, both vertical and horizontal vibrations can be detected. Therefore, holograms can be formed with precise spacing. This prevents the formation of holograms with incorrect spacing due to both vertical and horizontal vibrations.

It is to be noted that while description has been given with reference to the disk medium 22 capable of forming holograms in the present embodiment, the present invention is not limited thereto. For example, a medium with recorded video data in circulation in the market (e.g., CD (Compact Disk), DVD (Digital Versatile Disk)) may be used to detect vibrations on the medium. In this case, a laser device is provided to emit a laser beam so as to detect the vibrations. The laser beam from the laser device is applied to the medium, propagates therewithin, is emitted from the medium, and received by the PSD 33. It may be determined whether vibrations have occurred and whether vibrations continue, as described above based on the analog signals representing the amplitude levels from the PSD 33.

OTHER EMBODIMENT

While description has been given above of the vibration detection apparatus and the hologram apparatus according to the present invention in the event of vibrations on the disk medium 22, the above description is provided to facilitate the understanding of the present invention and not intended to limit the present invention. Various changes, substitutions and alterations can be made to the present invention without departing from spirit and scope of the invention.

>>Other Embodiment of Laser Beam Received by PSD<<

While the servo laser beam is emitted from the servo laser device and received by the PSD 33 after reflection within the disk medium 22 in the present embodiment, the present invention is not limited thereto.

Figure 7:
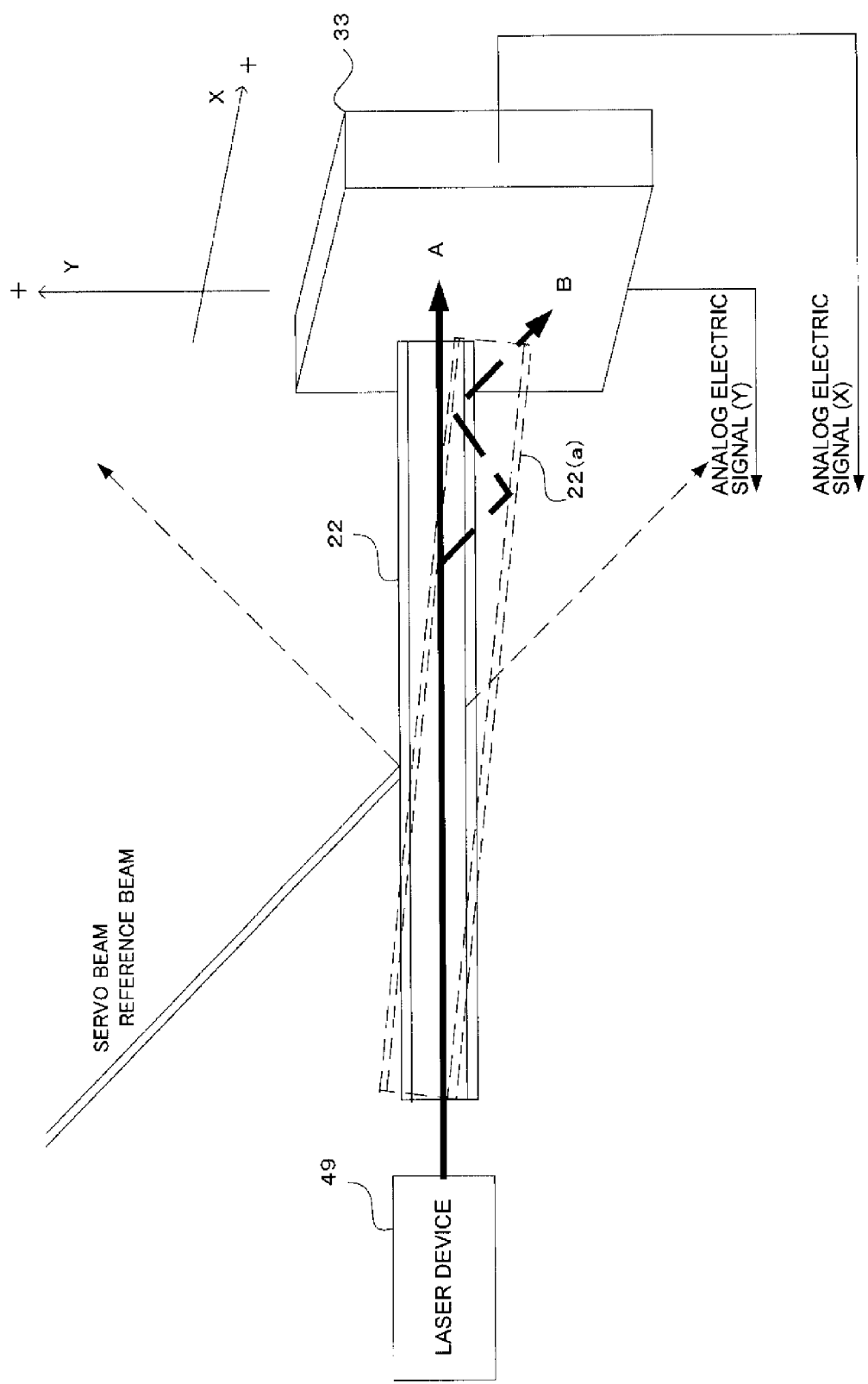
FIG. 7 illustrates transmission of a laser beam from one end face of a medium to the other end face of the same.

A laser device 49 is provided, for example as shown in FIG. 7, to emit a laser beam with a wavelength that does not affect the holograms formed on the disk medium 22, on the end face opposite to that facing the PSD 33. Then, the laser beam from the laser device 49 is irradiated into the disk medium 22. The laser beam emitted from the end face after transmitting through the disk medium 22 may be received by the PSD 33. For example, if the disk medium 22 shown in FIG. 7 tilts to the position denoted by a disk medium 22(*a*), the laser beam from the laser device 49 being applied to the PSD 33 after being reflected within the disk medium 22(*a*) as shown by the broken line. As a result, the laser beam receiving position when vibrations are occurring differs from that without vibrations. This makes it possible to detect the occurrence and amplitude level of vibrations from the analog electric signals (X) and (Y).

<<Position of Beam Reception by PSD>>

While the PSD 33 receives part of the servo laser beam emitted from the end face of the disk medium 22 in the present embodiment, the present invention is not limited thereto.

In the present embodiment, the disk medium 22 and the disk drive unit 25 are connected at the center of the disk medium 22 surface (i.e., center of the glass substrates forming part of the disk medium). For this reason, the vibrations taking place on the disk medium 22 appear at a maximum level on the end face of the disk medium 22. Hence, the PSD 33 is provided opposite the end face of the disk medium 22 to ensure that the occurrence of vibrations, even if extremely small, can be detected through calculation by the differentiation circuits 38 and 39. Consequently, the PSD 33 need not always be provided opposite the end face if the vibrations in the hologram apparatus and the disk medium 22 can be detected by the PSD 33. For example, if the vibrations can be detected from the laser beam reflected or transmitted by the disk medium 22, the PSD 33 may be provided so as to receive the reflected or transmitted laser beam.

Although the afore-mentioned embodiments are described herein with referring to a vibration detection apparatus and a hologram apparatus for detecting vibration of a disc-shaped and polygonal medium, the present invention should not be construed as limitative to such embodiments. The vibration detection apparatus and the hologram apparatus of the present invention may be applied to detection of vibration which occurs in any medium in which the afore-mentioned laser beam is transmitted such as a card-shaped medium.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A vibration detection apparatus comprising:
a vibration detection beam generation unit causing a vibration detection beam, incoherent to a beam for recording data to a medium and for detecting the presence/absence of vibrations, to be applied to the medium;
a light reception/determination unit receiving the vibration detection beam emitted from the medium after the vibration detection beam from the vibration detection beam generation unit is applied to and propagates through the medium, the light reception/determination unit determining whether the beam receiving position thereon is within a preset range; and
an output unit outputting a signal indicating that at least one of the medium and the vibration detection beam generation unit is vibrating on the basis of the determination result of the light reception/determination unit when the light reception/determination unit has determined that the position of beam reception is not within the preset range.

2. A hologram apparatus causing a coherent data beam corresponding to data to be recorded and a coherent reference beam to be applied to a hologram recording medium so as to record the data in the form of a hologram in the hologram recording medium, the hologram apparatus comprising:
a vibration detection beam generation unit causing a vibration detection beam, incoherent to the data and reference beams and to detect the presence/absence of vibrations, to be applied to the hologram recording medium;
a light reception/determination unit receiving the vibration detection beam emitted from the hologram recording medium after the vibration detection beam from the vibration detection beam generation unit is applied to and propagates through the hologram recording medium, the light reception/determination unit determining whether the beam receiving position is within a preset range; and
an interruption unit interrupting at least one of the data and reference beams from being applied to the hologram recording medium on the basis of the determination result of the light reception/determination unit when the light reception/determination unit has determined that the position of beam reception is not within the preset range.

3. The hologram apparatus of claim 2, comprising:
a variation calculation unit calculating variation between the beam receiving position and the preceding beam receiving position of the light reception/determination unit in response to the determination result of the light reception/determination unit; and
a variation determination unit determining whether the variation calculated by the variation calculation unit is less than a given variation, wherein
the interruption unit interrupts at least one of the data and reference beams from being applied to the hologram recording medium on the basis of the determination result of the variation determination unit indicating that the variation calculated by the variation calculation unit is at the given variation or greater.

4. The hologram apparatus of claim 2, comprising:
a vibration amount calculation unit calculating a vibration amount of at least one of the hologram recording medium and the vibration detection beam generation unit in response to the determination result of the light reception/determination unit; and
a vibration amount determination unit determining whether the vibration amount calculated by the vibration amount calculation unit is less than a given vibration amount, wherein
the interruption unit permits at least one of the data and reference beams to be applied to the hologram recording medium on the basis of the determination result of the vibration amount determination unit indicating that the vibration amount calculated by the vibration amount calculation unit is less than the given vibration amount.

5. The hologram apparatus of claim 2, comprising:
a period calculation unit calculating a reference period that allows the formation of the hologram; and
a period determination unit determining whether the total period of irradiation of the data and reference beams into the hologram recording medium has reached the reference period, wherein
the interruption unit interrupts at least one of the data and reference beams from being applied to the hologram recording medium on the basis of the determination result of the period determination unit indicating that the total period has reached the reference period.

6. The hologram apparatus of claim 5, comprising:
a page count calculation unit calculating the number of pages to be formed in the hologram recording medium based on the data amount of the data;
a deflection unit deflecting the reference beam so as to set the incidence angle for the reference beam to be applied to the hologram recording medium; and
a deflection control unit changing the deflection angle of the deflection unit so as to change the incidence angle of the reference beam, wherein
the period calculation unit sequentially calculates a corresponding number of the reference periods to the number of pages calculated by the page count calculation unit, wherein
the period determination unit sequentially determines for the pages whether the total period has reached the reference period, wherein
the deflection control unit sequentially varies the deflection angle of the deflection unit a corresponding number of times to the number of pages calculated by the page count calculation unit, wherein the deflection unit deflects the reference beam at the deflection angle sequentially varied by the deflection control unit, and wherein during periods of time until the period determination unit determines that the total period has reached the reference period, the reference beam deflected by the deflection unit and the data beam are sequentially applied to the hologram recording medium so as to form a hologram containing the number of pages calculated by the page count calculation unit.

7. The hologram apparatus of claim 2, wherein the data and reference beams are beams into which a laser beam is split, and wherein the interruption unit is provided in the optical path of the laser beam before where the laser beam is split.

8. The hologram apparatus of claim 2, comprising:

a servo control unit sending a control signal to carry out the tilt correction of the hologram recording medium based on the vibration detection beam transmitting through or reflected by the hologram recording medium; and a servo drive unit carrying out the tilt correction of the hologram recording medium according to the control signal from the servo control unit.

9. The hologram apparatus of claim 2, wherein the hologram recording medium is a disk medium, and wherein the light reception/determination unit receives the vibration detection beam emitted from the end face of the hologram recording medium after the vibration detection beam is applied to and propagates through the hologram recording medium.

10. The hologram apparatus of claim 9, wherein the light reception/determination unit discriminates between a vertical position in a direction perpendicular to a disk surface of the disk medium and a horizontal position in a direction parallel to the disk surface, the hologram apparatus including:

a vertical variation calculation unit calculating variation between a vertical position of the beam receiving position on the light reception/determination unit and a vertical position of the preceding beam receiving position in response to the determination result of the light reception/determination unit;

a horizontal variation calculation unit calculating variation between a horizontal position of the beam receiving position on the light reception/determination unit and a horizontal position of the preceding beam receiving position in response to the determination result of the light reception/determination unit;

a vertical variation determination unit determining whether the variation calculated by the vertical variation calculation unit is less than a given variation;

a horizontal variation determination unit determining whether the variation calculated by the horizontal variation calculation unit is less than a given variation;

a vertical vibration amount calculation unit calculating a vibration amount for the vertical position of at least one of the disk medium and the vibration detection beam generation unit in response to the determination result of the light reception/determination unit;

a horizontal vibration amount calculation unit calculating a vibration amount for the horizontal position of at least one of the disk medium and the vibration detection beam generation unit in response to the determination result of the light reception/determination unit;

a vertical vibration amount determination unit determining whether the vibration amount calculated by the vertical vibration amount calculation unit is less than a given vibration amount; and a horizontal vibration amount determination unit determining whether the vibration amount calculated by the horizontal vibration amount calculation unit is less than a given vibration amount, wherein the interruption unit interrupts at least one of the data and reference beams from being applied to the disk medium on the basis of the determination result of the vertical variation determination unit indicating that the variation calculated by the vertical variation calculation unit is at the given variation or greater, or of the determination result of the horizontal variation determination unit indicating that the variation calculated by the horizontal variation calculation unit is at the given variation or greater, and wherein the interruption unit permits at least one of the data and reference beams to be applied to the disk medium on the basis of the determination result of the vertical vibration amount determination unit indicating that the vibration amount calculated by the vertical vibration amount calculation unit is less than the given vibration amount and of the determination result of the horizontal vibration amount determination unit indicating that the vibration amount calculated by the horizontal vibration amount calculation unit is less than the given vibration amount.

11. A vibration detection method for a medium comprising:

causing a vibration detection beam, incoherent to a beam for recording data to a medium of a vibration detection beam generating unit and for detecting the presence/absence of vibrations, to be applied to the medium;

receiving the vibration detection beam emitted from the medium after the vibration detection beam from the vibration detection beam generation unit is applied to and propagates through the medium;

determining whether the beam receiving position is within a preset range; and outputting a signal indicating that at least one of the medium and the vibration detection beam generation unit is vibrating, when the light reception/determination unit has determined that the position of beam reception is not within the preset range.

12. A recording method for a hologram apparatus causing a coherent data beam corresponding to data to be recorded and a coherent reference beam to be applied to a hologram recording medium so as to record the data in the form of a hologram in the hologram recording medium, the recording method comprising:

applying a vibration detection beam, incoherent to the data and reference beams and to detect the presence/absence of vibrations, to the hologram recording medium;

receiving the vibration detection beam emitted from the hologram recording medium after the vibration detection beam is applied to and propagates through the hologram recording medium;

determining whether the beam receiving position is within a preset range; and interrupting at least one of the data and reference beams from being applied to the hologram recording medium on the basis of the determination result when it has been determined that the position of beam reception is not within the preset range.

* * * * *

UNITED STATES PATENT AND TRADEMARK OFFICE
CERTIFICATE OF CORRECTION

PATENT NO. : 7,471,429 B2  Page 1 of 1
APPLICATION NO. : 11/276504
DATED : December 30, 2008
INVENTOR(S) : Kazuya Kogure et al.

It is certified that error appears in the above-identified patent and that said Letters Patent is hereby corrected as shown below:

On the Title Page, under Assignees, change "Imphase Technologies" to --InPhase Technologies--.

Signed and Sealed this

Third Day of March, 2009

JOHN DOLL
*Acting Director of the United States Patent and Trademark Office*